(12) United States Patent
Saito et al.

(10) Patent No.: US 6,310,407 B1
(45) Date of Patent: Oct. 30, 2001

(54) PASSENGER DETECTING SYSTEM AND AIR BAG SYSTEM USING THE SAME

(75) Inventors: Takashi Saito; Kenji Kumagai; Kazunori Jinno; Satoshi Baba, all of Osaka; Masahiro Ofuji, Kanagawa; Tsutomu Fukui, Saitama; Nobuhiro Koyota, Saitama; Takashi Inou, Saitama; Kazutomo Isonaga, Saitama; Makoto Nagai, Saitama, all of (JP)

(73) Assignees: NEC Corporation; Hon-da Giken Kogyo Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/345,404

(22) Filed: Jul. 1, 1999

(30) Foreign Application Priority Data

Jul. 13, 1998 (JP) ................................. 10-197669
Jul. 13, 1998 (JP) ................................. 10-197670
Jul. 13, 1998 (JP) ................................. 10-197671
Aug. 31, 1998 (JP) ................................. 10-245893

(51) Int. Cl.$^7$ ................................................. B60L 3/00
(52) U.S. Cl. .................. 307/10.1; 340/370.37; 324/663
(58) Field of Search .................. 307/10.1; 324/663; 340/370.37; 219/217; 600/395

(56) References Cited

U.S. PATENT DOCUMENTS 3,954,100 * 5/1976 Sem-Jacobsen ..................... 128/2.06
5,844,415    12/1998 Gershenfeld et al. .
5,936,412 *  8/1999 Gershenfeld et al. ............... 324/663
6,093,910 *  7/2000 McClintock et al. ................ 219/217

FOREIGN PATENT DOCUMENTS 0 838 697 A2   4/1998  (EP) .
61-113527      5/1986  (JP) .
3-52266        5/1991  (JP) .
4-46843        2/1992  (JP) .
9-509118       9/1997  (JP) .
11271463      10/1999  (JP) .
WO 97/31238    8/1997  (WO) .

* cited by examiner

Primary Examiner—Josie Ballato
Assistant Examiner—Robert L. Deberadinis
(74) Attorney, Agent, or Firm—McGuireWoods LLP

(57) ABSTRACT

A passenger detecting system includes a plurality of antenna electrodes provided in a seat, a signal generating section, a detecting section, a switching circuit and a control unit. The signal generating section generates an electrode signal. The switching circuit sequentially supplies the electrode signal to the plurality of antenna electrodes one by one in response to a switching control signal. The detecting section detects change of the electrode signal to generate a detection signal when the electrode signal is supplied to each of the plurality of antenna electrodes. The control unit outputs the switching control signal to the switching circuit and generates a passenger data associated with a passenger on the seat based on the detection signal for each of the plurality of antenna electrodes.

43 Claims, 26 Drawing Sheets

OUTPUT SIGNAL $t_n$ $T_n = t_n/S$ $NT_n = T_n/S_{um}$

OUTPUT SIGNAL $t_n$ $T_n = t_n / s$

PASSENGER DETECTING SYSTEM AND AIR BAG SYSTEM USING THE SAME

BACKGROUND OF THE INVENTION

1. Field of the Invention

The present invention relates to a passenger detecting system, a passenger detecting method and an air bag system using the same. More particularly, the present invention relates to the technique for detecting an existence or non-existence of a passenger in a passenger seat in an automobile and for controlling the expansion of an air bag in an air bag system based on the detection result.

2. Description of the Related Art

Generally, an air bag system is a system to protect a driver of an automobile from the impact when an automobile collides. Recently, the air bag system is installed for a passenger in addition to a driver. Thus, even if the automobile collides, the passenger on the passenger seat can be protected from the impact on the collision by the expanding operation of the air bag in addition to the driver.

As shown in FIG. 1, an air bag system is composed of a squib circuit on the side of a driver seat, a squib circuit on the side of a passenger seat, an electronic acceleration sensor (a collision detecting sensor) GS and a control circuit CC. The squib circuit on the side of the driver seat is composed of a series circuit of a safing sensor SS1, a squib SQ1, and a semiconductor switching element SW1 such as a field effect transistor. The squib circuit on the side of the passenger seat is composed of a series circuit of a safing sensor SS2, a squib SQ2, and a semiconductor switching element SW2 of a field effect transistor. The control circuit CC detects collision in response to an output signal of the electronic acceleration sensor GS and supplies detection signals to the gates of the semiconductor switching elements SW1 and SW2.

According to the air bag system, when the automobile collides because of any cause, the switch contacts of the safing sensors SS1 and SS2 respond to the relatively small acceleration to be closed. The squib circuit on the side of the driver seat and the squib circuit on the side of the passenger seat are set to the operable state. When the control circuit CC determines the collision of the automobile in response to an acceleration detection signal from the electronic acceleration sensor GS, the control circuit CC supplies the detection signals to the gates of the semiconductor switching elements SW1 and SW2. As a result, the switching elements SW1 and SW2 are set to the ON state. Thus, current flows through each squib circuit. In this way, the air bag on the side of the driver seat and the air bag on the side of the passenger seat are expanded because of heat generation by the squibs SQ1 and SQ2 to protect the driver and the passenger from the impact due to the collision.

By the way, in this air bag system, an air bag is expanded irrespective of existence or non-existence of the passenger on the passenger seat, when the automobile collides. Therefore, when the passenger has sat on the passenger seat, the protection effect of the passenger can be expected upon the collision. In this case, however, when the passenger is not on the passenger seat, the expansion of the air bag does not have any meaning and a repair expenses to restore the air bag becomes necessary. Therefore, it is preferable that a passenger detecting system determines whether or not a passenger is on the passenger seat, and the expansion operation of the air bag system is performed upon the collision, only when the passenger is on the passenger seat.

In order to solve the above problem, an air bag system as shown in FIG. 2 is proposed. In the air bag system shown in FIG. 2, a sensor SD is provided to determine whether or not a passenger is on the passenger seat, and the control circuit CC determines that the passenger is on the passenger seat, based on a detection signal of the sensor SD. Thus, an air bag is set to an either of the expansion allowed state in which it is expanded when the automobile collides or the expansion inhibited state in which it is not expanded even when the automobile collides.

As the passenger detecting system to detect the existence or non-existence of the passenger on the passenger seat are proposed various systems. In Japanese Laid Open Patent Application (JP-A-Heisei 4-46843), Japanese Laid Open Utility Model Application (JP-U-Heisei 3-52266), Japanese Laid Open Patent Application (JP-A-Showa 61-113527), a passenger detecting system in which a weight sensor is incorporated inside the seat is disclosed. Also, in Japanese Laid Open Patent Application (JP-A-Heisei 9-509118), a passenger detecting system in which electrodes are arranged in a seat section and a back supporting section of a seat and an oscillation circuit is connected between the electrodes or between the electrode and the chassis of a vehicle.

According to the former passenger detecting system, the weight sensor does not respond when anybody or anyone is not on the passenger seat. Thus, the existence or non-existence of the passenger on the passenger seat can be detected by the weight sensor. Also, according to the latter passenger detecting system, a capacitance increases between the electrodes or between the electrode and the chassis of the automobile when the passenger is on the seat. The passenger detecting system using the weight sensor is possible to perform the rough determination of whether the passenger on the passenger seat is an adult or a child. An air bag is set to either of the expansion allowed state or the expansion inhibited state, based on the determination result. Thus, an unexpected situation upon the collision of the automobile can be avoided. However, the weights are quite different between individuals and a child can be sometimes heavier than an adult. Therefore, the passenger detecting system using the weight sensor lacks of accuracy.

On the other hand, the capacitance decreases when any passenger is not on the passenger seat. The change of an oscillation frequency due to the change of the capacitance is detected using this phenomenon and the existence or non-existence of the passenger on the passenger seat can be detected. Also, when the passenger is not on the passenger seat, the expansion operation of the air bag system can be prevented, unlike the conventional air bag system. However, the electrode 4 is connected to a cable 106 using a connector 110. Therefore, there is a problem that the work efficiency is low and the reliability is low.

In addition to the technique using a sensor detecting the weight of a passenger, there is known the technique in which the passenger is picked up by a camera and determinations of whether the existence or non-existence of the passenger is on the passenger seat, and whether the passenger is a adult or a child are performed through an image processing. Thus, in case of the passenger detecting system using a camera, the existence or non-existence of the passenger, and the adult or the child can be quite correctly determined. However, because a passenger pattern must be determined from various data obtained by processing the imaging data which has been taken by the camera, a processor becomes complicated and expensive.

SUMMARY OF THE INVENTION

Therefore, an object of the present invention is to provide a passenger detecting system and a passenger detecting method which can detect the existence or non-existence of a passenger on a passenger seat accurately without being too much influenced by a wear, the figure and the attitude of the passenger.

Another object of the present invention is to provide a passenger detecting system and a passenger detecting method, which can accurately detect whether the passenger is an adult or a child.

Still another object of the present invention is to provide a passenger detecting system using an electrode connection structure formed such that a cable can be connected with antenna electrodes formed on a base member.

Yet still another object of the present invention is to provide an air bag system which includes either of the above passenger detecting systems and in which the expansion of an air bag can be controlled based on a detecting result of the passenger detecting system.

In order to achieve an aspect of the present invention, a passenger detecting system includes a plurality of antenna electrodes provided in a seat, a signal generating section, a detecting section, a switching circuit and a control unit. The signal generating section generates an electrode signal. The switching circuit sequentially supplies the electrode signal to the plurality of antenna electrodes one by one in response to a switching control signal. The detecting section detects change of the electrode signal to generate a detection signal when the electrode signal is supplied to each of the plurality of antenna electrodes. The control unit outputs the switching control signal to the switching circuit and generates a passenger data associated with a passenger on the seat based on the detection signal for each of the plurality of antenna electrodes.

The passenger detecting system may further include an amplitude detecting circuit detecting an amplitude of the electrode signal, and an amplitude control circuit adjusting the amplitude of the electrode signal to a predetermined value in response to an amplitude control signal. The control unit outputs the amplitude control signal to the amplitude control circuit based on the detected amplitude of the electrode signal by the amplitude detecting circuit.

The passenger data preferably includes a first data indicative of existence or non-existence of the passenger on the seat. Also, it is preferable that the passenger data further includes a second data indicative of whether or not the passenger is a child or an adult.

The control unit may calculate a summation of the detection signals for the plurality of antenna electrodes, and determine whether the passenger exists on the seat, based on the summation to generate the passenger data. In this case, when it is determined that the passenger exists on the seat, the control unit may calculate a ratio data of each of the detection signals to the summation, and determine whether the passenger is a child or an adult, based on a distribution pattern of the radio data of the detection signals, to generate the passenger data. Instead, when it is determined that the passenger exists on the seat, the control unit may calculate a ratio data of each of the detection signals to the summation, determine the ratio data corresponding to a head of the passenger, calculate a second summation of the ratio data of the detection signals other than the ratio data corresponding to the head, and determine whether the passenger is a child or an adult, based on the second summation, to generate the passenger data.

The detecting section may further detect a phase difference before and after the change of the electrode signal. The control unit determines whether the passenger exists on the seat, based on the phase difference, to generate the passenger data. In this case, when it is determined that the passenger exists on the seat, the control unit may detect one of the plurality of antenna electrodes corresponding to a position of a shoulder of the passenger, based on the detection signals, and determine whether the passenger is a child or an adult, based on the detected antenna electrode, to generate the passenger data.

It is preferable that the plurality of antenna electrodes are dispersedly provided in the seat. The plurality of antenna electrodes may be provided to extend in a horizontal direction and to be apart from each other in a vertical direction. Also, each of the plurality of antenna electrodes may be a metal plate. Instead, each of the plurality of antenna electrodes may be an electrically conductive portion of an insulation cloth. Instead, each of the plurality of antenna electrodes may be a portion of an insulation cloth in which an electrically conductive paint is painted. Instead, each of the plurality of antenna electrodes may be a portion of an insulation cloth in which metal threads are woven.

Each of the antenna electrodes is connected to the switching circuit by use of a cable, and the cable has a washer having a peripheral section and a plurality of portions extending from the peripheral section into a direction of a center portion. In this case, a fixture has a first section of a first diameter, a second section of a second diameter on the first section, the second diameter being smaller than the first diameter, and a third section of a third diameter on the second section, the third diameter being larger than the first diameter, and the fixture is pushed and inserted to pass through a base member, the antenna electrode and the center portion of the washer such that the base member and the antenna electrode are sandwiched by the third section of the fixture and the peripheral section of the washer through an elastic force of the plurality of portions of the washer. In this case, each antenna electrode is turned at an edge portion of the base member, and the washer is electrically conductive.

In order to achieve another aspect of the present invention a method of detecting a passenger in an automobile, include:

sequentially supplying an electrode signal to a plurality of antenna electrodes one by one, the plurality of antenna electrodes being provided in a seat;

detecting change of the electrode signal to generate a detection signal when the electrode signal is supplied to each of the plurality of antenna electrodes; and generating a passenger data associated with a passenger on the seat based on the detection signal for each of the plurality of antenna electrodes.

The method may further include:

detecting an amplitude of the electrode signal; and adjusting the amplitude of the electrode signal to a predetermined value based on the detected amplitude of the electrode signal.

The generating a passenger data may includes determining whether the passenger is on the seat, and whether the passenger is a child or an adult, based on a distribution pattern of the detection signals.

The generating a passenger data may includes:

calculating a summation of the detection signals for the plurality of antenna electrodes; and determining whether the passenger exists on the seat, based on the summation to generate the passenger data. In this case, the generating a passenger data may include:

calculating a ratio data of each of the detection signals to the summation, when it is determined that the passenger exists on the seat; and determining whether the passenger is a child or an adult, based on a distribution pattern of the radio data of the detection signals, to generate the passenger data.

Also, the generating a passenger data may include:

calculating a ratio data of each of the detection signals to the summation, when it is determined that the passenger exists on the seat;

determining the ratio data corresponding to a head of the passenger;

calculating a second summation of the ratio data of the detection signals other than the ratio data corresponding to the head; and determining whether the passenger is a child or an adult, based on a distribution pattern of the radio data of the detection signals, to generate the passenger data.

The method may further include detecting a phase difference before and after the change of the electrode signal. At this time, the generating a passenger data includes determining whether the passenger exists on the seat, based on the phase difference, to generate the passenger data. In this case, the generating a passenger data may include:

detecting one of the plurality of antenna electrodes corresponding to a position of a shoulder of the passenger, based on the detection signals, when it is determined that the passenger exists on the seat; and determining whether the passenger is a child or an adult, based on the detected antenna electrode, to generate the passenger data.

In order to achieve another aspect of the present invention, a passenger detecting system include a plurality of antenna electrodes provided in a seat, a detecting section and a control unit. The detecting section detects change of an electric field intensity around each of the plurality of antenna electrodes to generate a detection signal. The control unit generates a passenger data associated with a passenger on the seat based on the detection signal for each of the plurality of antenna electrodes.

The passenger data preferably includes a first data indicative of existence or non-existence of the passenger on the seat, and a second data indicative of whether or not the passenger is a child or an adult.

Also, it is preferably that the plurality of antenna electrodes are dispersedly provided in the seat. In this case, the plurality of antenna electrodes may be provided to extend in a horizontal direction and to be apart from each other in a vertical direction. Each of the plurality of antenna electrodes may be a metal plate. Instead, each of the plurality of antenna electrodes may be an electrically conductive portion of an insulation cloth. Instead, each of the plurality of antenna electrodes may be a portion of an insulation cloth in which an electrically conductive paint is painted. Instead, each of the plurality of antenna electrodes may be a portion of an insulation cloth in which metal threads are woven.

In order to achieve another aspect of the present invention, an air bag system with a passenger detecting system include a plurality of antenna electrodes, a detecting section, a control unit, an air bag and an air bag control unit. The plurality of antenna electrodes are provided in a seat. The detecting section detects change of an electric field intensity around each of the plurality of antenna electrodes to generate a detection signal. The control unit generates a passenger data associated with a passenger on the seat based on the detection signal for each of the plurality of antenna electrodes. Then air bag control unit controls the air bag such that the air bag is selectively expanded based on the passenger data.

The air bag system may further include a signal generating section generating an electrode signal, and a switching circuit sequentially supplying the electrode signal to the plurality of antenna electrodes one by one in response to a switching control signal such that an electric field is generated around the plurality of antenna electrodes. At this time, the control unit outputs the switching control signal to the switching circuit.

Also, the air bag system may further include an amplitude detecting circuit detecting an amplitude of the electrode signal, and an amplitude control circuit adjusting the amplitude of the electrode signal to a predetermined value in response to an amplitude control signal. At this time, the control unit outputs the amplitude control signal to the amplitude control circuit based on the detected amplitude of the electrode signal by the amplitude detecting circuit.

The passenger data may include a first data indicative of existence or non-existence of the passenger on the seat. At this time, when the passenger data indicates non-existence of the passenger, the air bag control unit controls the air bag such that the air bag is not expanded.

Also, the passenger data may include a second data indicative of whether or not the passenger is a child or an adult. At this time, when the passenger data indicates that the passenger is the child, the air bag control unit controls the air bag such that the air bag is not expanded.

The control unit may calculate a summation of the detection signals for the plurality of antenna electrodes, and determine whether the passenger exists on the seat, based on the summation to generate the passenger data. In this case, when it is determined that the passenger exists on the seat, the control unit may calculate a ratio data of each of the detection signals to the summation, and determine whether the passenger is a child or an adult, based on a distribution pattern of the radio data of the detection signals, to generate the passenger data. Also, when it is determined that the passenger exists on the seat, the control unit may calculate a ratio data of each of the detection signals to the summation, determine the ratio data corresponding to a head of the passenger, calculate a second summation of the ratio data of the detection signals other than the ratio data corresponding to the head, and determine whether the passenger is a child or an adult, based on the second summation, to generate the passenger data.

Also, the air bag system may further include a phase difference detecting section detecting a phase difference in a displacement current before and after the change of the electric intensity de signal. At this time, the control unit determines whether the passenger exists on the seat, based on the phase difference, to generate the passenger data. In this case, when it is determined that the passenger exists on the seat, the control unit may detect one of the plurality of antenna electrodes corresponding to a position of a shoulder of the passenger, based on the detection signals, and determine whether the passenger is a child or an adult, based on the detected antenna electrode, to generate the passenger data.

The plurality of antenna electrodes may be dispersedly provided in the seat. In this case, the plurality of antenna electrodes may be provided to extend in a horizontal direction and to be apart from each other in a vertical direction. Instead, each of the plurality of antenna electrodes may be a metal plate. Instead, each of the plurality of antenna electrodes may be an electrically conductive portion of an insulation cloth. Instead, each of the plurality of antenna electrodes may be a portion of an insulation cloth in which an electrically conductive paint is painted. Instead, each of the plurality of antenna electrodes may be a portion of an insulation cloth in which metal threads are woven.

When each of the antenna electrodes is connected to the switching circuit by use of a cable, and when the cable has a washer having a peripheral section and a plurality of portions extending from the peripheral section into a direction of a center portion, a fixture preferably has a first section of a first diameter, a second section of a second diameter on the first section, the second diameter being smaller than the first diameter, and a third section of a third diameter on the second section, the third diameter being larger than the first diameter. The fixture is preferably pushed and inserted to pass through a base member, the antenna electrode and the center portion of the washer such that the base member and the antenna electrode are sandwiched by the third section of the fixture and the peripheral section of the washer through an elastic force of the plurality of portions of the washer. In this case, the antenna electrode is turned at an edge portion of the base member, and the washer is electrically conductive.

In order to achieve another aspect of the present invention, a method of controlling expansion of an air bag in an automobile, include:

sequentially supplying an electrode signal to a plurality of antenna electrodes one by one, the plurality of antenna electrodes being provided in a seat;

detecting change of the electrode signal to generate a detection signal when the electrode signal is supplied to each of the plurality of antenna electrodes;

generating a passenger data associated with a passenger on the seat based on the detection signal for each of the plurality of antenna electrodes;

controlling an air bag based on the passenger data such that the air bag is selectively expanded.

The method may further include:

detecting an amplitude of the electrode signal; and adjusting the amplitude of the electrode signal to a predetermined value based on the detected amplitude of the electrode signal.

Also, the controlling an air bag includes:

allowing expansion of the air bag when it is determined that the passenger is on the seat and that the passenger is an adult; and inhibiting the expansion of the air bag when it is determined that the passenger is not on the seat or that the passenger is a child.

The generating a passenger data may include determining whether the passenger is on the seat, and whether the passenger is a child or an adult, based on a distribution pattern of the detection signals. Otherwise, the generating a passenger data may include:

calculating a summation of the detection signals for the plurality of antenna electrodes; and determining whether the passenger exists on the seat, based on the summation to generate the passenger data. In this case, the generating a passenger data includes:

calculating a ratio data of each of the detection signals to the summation, when it is determined that the passenger exists on the seat; and determining whether the passenger is a child or an adult, based on a distribution pattern of the radio data of the detection signals, to generate the passenger data.

Also, the generating a passenger data may include:

calculating a ratio data of each of the detection signals to the summation, when it is determined that the passenger exists on the seat;

determining the ratio data corresponding to a head of the passenger;

calculating a second summation of the ratio data of the detection signals other than the ratio data corresponding to the head; and determining whether the passenger is a child or an adult, based on a distribution pattern of the radio data of the detection signals, to generate the passenger data.

The method may further include detecting a phase difference before and after the change of the electrode signal, and the generating a passenger data includes determining whether the passenger exists on the seat, based on the phase difference, to generate the passenger data.

Also, the generating a passenger data may include:

detecting one of the plurality of antenna electrodes corresponding to a position of a shoulder of the passenger, based on the detection signals, when it is determined that the passenger exists on the seat; and determining whether the passenger is a child or an adult, based on the detected antenna electrode, to generate the passenger data.

DESCRIPTION OF THE PREFERRED EMBODIMENTS

Next, the passenger detecting system of the present invention and the air bag system using the passenger detecting system will be described with reference to the attached drawings.

Figure 4A:
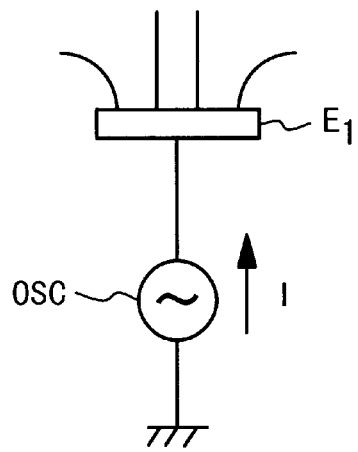
FIG. 4A is a diagram showing an electric field distribution in the neighborhood of an antenna electrode when any object does not exist in the neighborhood of the antenna electrode.
Figure 4B:
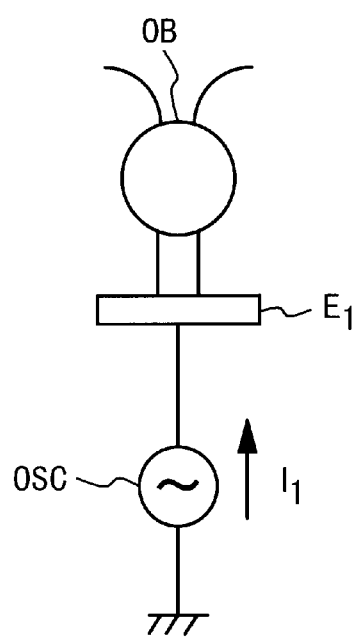
FIG. 4B is a diagram showing an electric field distribution in the neighborhood of the antenna electrode when an object exists in the neighborhood of the antenna electrode, in a passenger detecting system of the present invention.

FIGS. 4A and 4B are diagram showing the basic concept of the present invention. Referring to FIG. 4, the passenger detecting system of the present invention uses the distortion of weak electric field which is generated around an antenna electrode which is arranged in a seat. As shown in FIG. 4A, when a high frequency low voltage signal is applied from an oscillation circuit OSC to the antenna electrode E1, the weak electric field is generated around the antenna electrode E1. As a result, a displacement current I flows through the antenna electrode E1. In this state, as shown in FIG. 4B, when an object OB approaches the neighborhood of the antenna electrode E1, the electric field is distorted so that a displacement current I1 flows through the antenna electrode E1. The displacement current I1 is different from the current I.

Therefore, when this basic concept is applied to a seat of an automobile, the displacement current which flows through the antenna electrode E1 changes depending upon the existence or non-existence of the object OB on the seat. By using this phenomenon, the existence or non-existence of the passenger on the seat can be detected. Also, whether the passenger on the seat is an adult or a child can be detected, because dielectric constants are different between the adult and the child from each other. Especially, if the number of antenna electrodes is increased, a lot of data of the object or passenger on the seat becomes able to be obtained, so that the existence or non-existence of the passenger on the seat can be more accurately detected.

Next, the passenger detecting system according to the first embodiment of the present invention which uses this principle will be described with reference to FIGS. 5A and 5B, FIGS. 6A and 6B, FIG. 7, and FIG. 8. FIGS. 5A and 5B and FIGS. 6A and 6B show the seat 1 of the passenger side or the driver side in the first embodiment of the present invention.

Figure 5A:
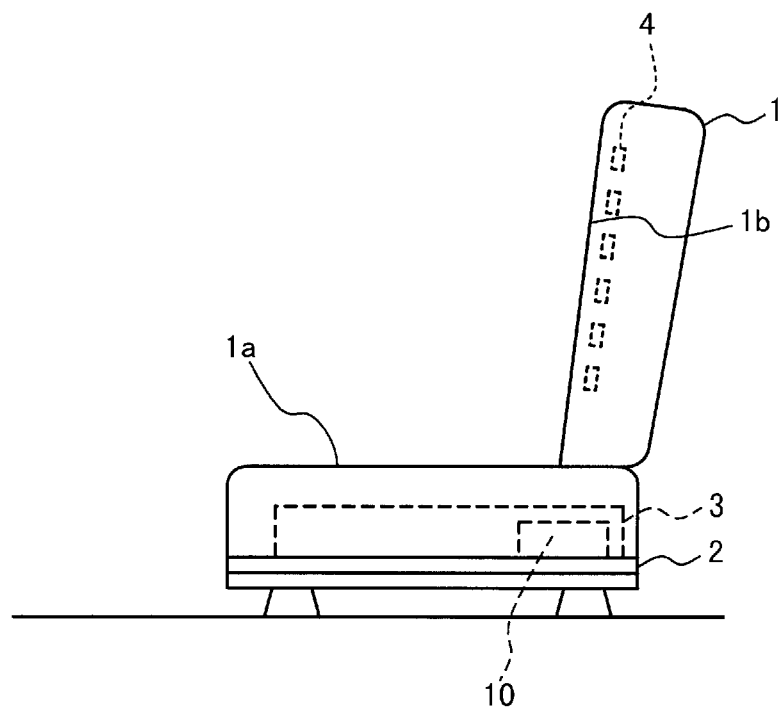
FIGS. 5A and 5B are a side view and a front view showing the arrangement state of the antenna electrodes in a seat in the passenger detecting system of the present invention, respectively.

As shown in FIG. 5A, the seat 1 is mainly composed of a seat section 1a and a back supporting section 1b. For example, the seat section 1a is composed of a base 2 slidable in front and back directions, a seat frame 3 fixed on the base 2, a cushion material which is arranged on the seat frame 3 and an exterior material covering the cushion material. The back supporting section 1b is composed of the cushion material arranged on the front side of the seat frame and the exterior material covering a cushion material.

Figure 5B:
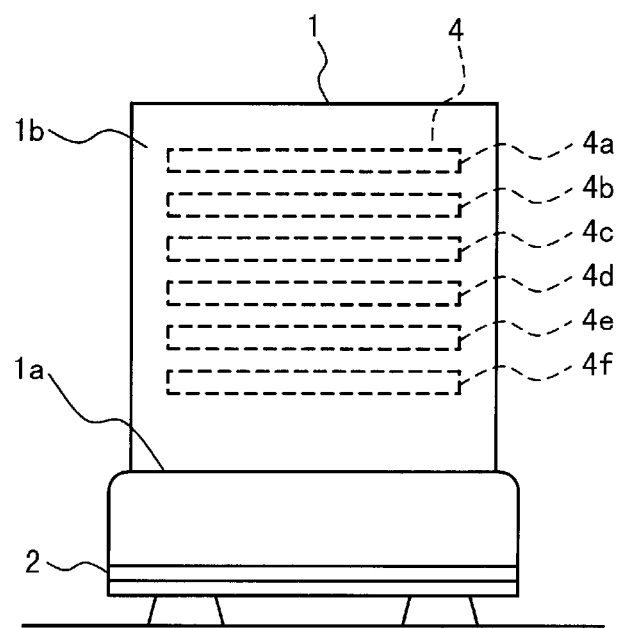

Especially, as shown in FIG. 5B, a plurality of band-shaped antenna electrodes 4 (4a, 4b, . . . , 4f) are dispersedly arranged in the back supporting section 1b. That is, the plurality of band-shaped antenna electrodes 4 (4a, 4b, . . . 4f) are arranged to extend in a horizontal width direction of the back supporting section 1b apart from each other in a vertical direction. It should be noted that the antenna electrodes 4 may be provided inside the exterior material or outside the exterior material. Also, the antenna electrodes 4 may be incorporated in the exterior material. The antenna electrode 4 is composed of a band extending in the horizontal direction. However, the antenna electrode 4 may be composed of a plurality of electrode portions. Also, a control unit 10 to be described later is arranged on the seat frame 3 or in the neighborhood of the seat frame 3.

Figure 6A:
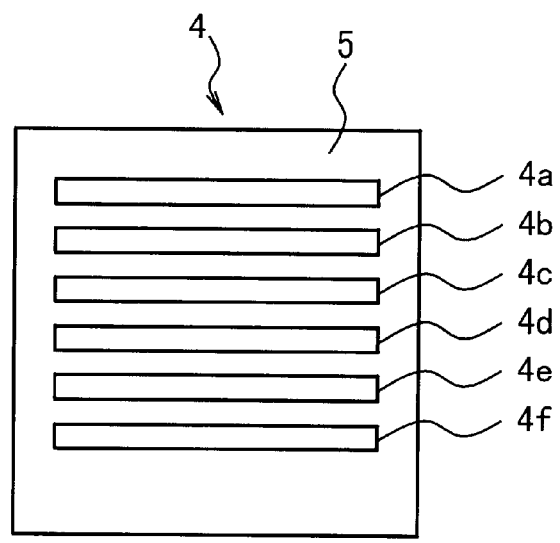
FIGS. 6A and 6B are a plan view and a cross sectional view showing a structure example of the antenna electrodes, respectively.
Figure 6B:
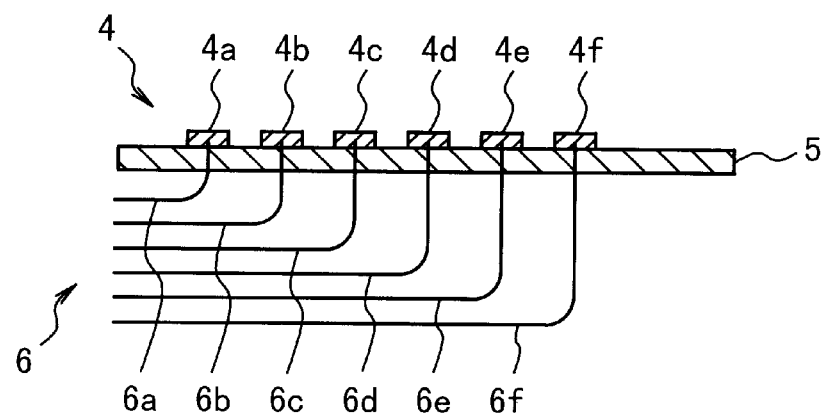

The plurality of antenna electrodes 4 are arranged inside the exterior material of the back supporting section 1b in the first embodiment. As shown in FIGS. 6A and 6B, the antenna electrodes 4a, 4b, . . . , 4f have a band shape with an identical size of 30 mm in wide and 280 mm in long. The antenna electrodes 4a, 4b, . . . , 4f are arranged on one of the surfaces of the base member 5 which is composed of an insulating member. The antenna electrodes 4a, 4b, . . . , 4f are separated from each other by a predetermined distance, e.g., by 10 mm in the vertical direction.

Instead, for example, the antenna electrodes 4 may be formed as electrically conductive portions in an insulation cloth. Also, the antenna electrodes 4 may be woven into the exterior seat cloth of the back supporting section 1b as thread-shaped metal, or may be coated with electrically conductive paint on the seat cloth surface.

Especially, lead lines 6 (6a, 6b, . . . , 6f) are independently connected to the antenna electrodes 4a, 4b, . . . , 4f, respectively. The lead lines 6 are connected with a connector of a control unit 10 or terminals 19 (19a, . . . , 19f).

Figure 7:
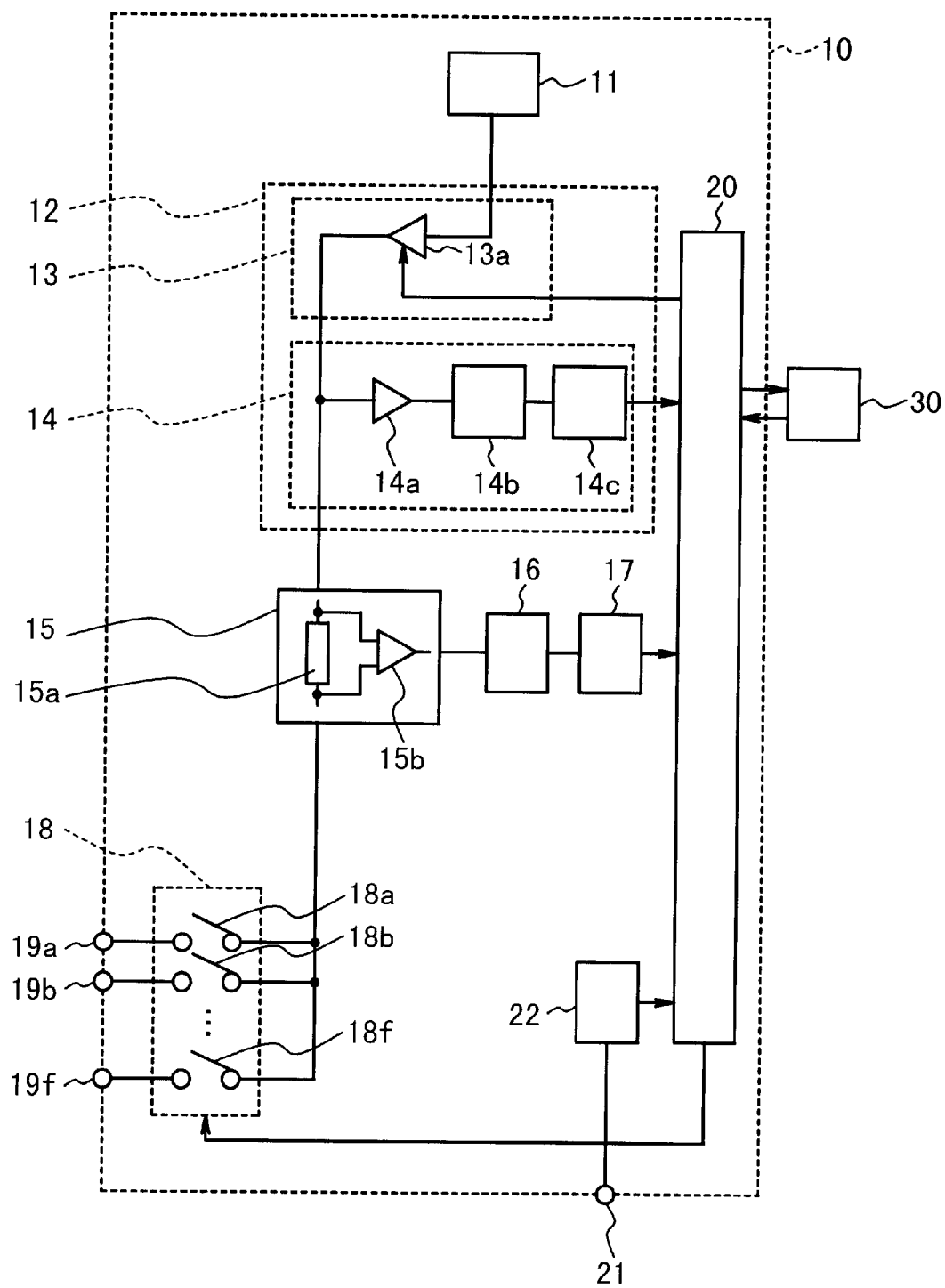
FIG. 7 is a circuit block diagram showing the structure of the passenger detecting system according to a first embodiment of the present invention.

The control unit 10 is arranged in the seat frame 3 of the above-mentioned seat 1 or in the neighborhood of the seat frame 3. As shown in FIG. 7, the control unit 10 is composed of an oscillation circuit 11, an amplitude control circuit 12, a current detecting circuit 15, an AC-DC converting circuit 16, an amplifier 17, a switching circuit 18, connectors 19 (19a, . . . , 19f), a control circuit 20, a connector 21 and a power supply circuit 22.

For example, the oscillation circuit 11 generates a high frequency low voltage signal having the amplitude of about 5 to 12 V and the frequency of about 100 KHz. Weak electric field is generated in the neighborhood of the antenna electrodes 4 by the high frequency low voltage signal. The amplitude control circuit 12 detects the voltage amplitude the high frequency low voltage signal from the oscillation circuit 11 to output an amplitude detection signal to the control circuit 20. Also, the amplitude control circuit 12 controls the voltage amplitude of the high frequency low voltage signal to an approximately constant value in response to an amplitude control signal supplied from the control circuit 20. The current detecting circuit 15 detects a displacement current of the high frequency low voltage signal to output a detection signal. The AC-DC converting circuit 16 converts the detection signal from the current detecting circuit 15 into a direct current (DC) signal. The amplifier 17 amplifies the output DC signal supplied from the AC-DC converting circuit 16 and outputs the amplified signal to the control circuit 20 as a current detection signal. The switching circuit 18 has a plurality of switches 18 (18a, 18b, . . . , 18f) for the antenna electrodes 4a to 4f and is connected with the current detecting circuit 15. The connectors 19 (19a, . . . , 19f) are connected with the switches 18a to 18f of the switching circuit 18 and are arranged in the housing of the control unit. The connector 21 is also arranged in the housing and is connected with the battery power supply (not shown). The power supply circuit 22 is connected between the connector 21 and the control circuit 20. The control circuit 20 of the passenger detecting system 10 contain an MPU, and is connected with an air bag control system 30 shown in FIG. 8. It should be noted that the selective switching between the switches 18a to 18f of the switching circuit 18 is performed based on a switching control signal from the control circuit 20.

In the passenger detecting system, the amplitude control circuit 12 is composed of an amplitude adjusting circuit 13 and an amplitude detecting circuit 14. The amplitude adjusting circuit 13 variably changes or controls the voltage amplitude of the high frequency low voltage signal in response to an amplitude control signal from the control circuit 20. The amplitude detecting circuit 14 detects the voltage amplitude of the high frequency low voltage signal to output the amplitude detection signal to the control circuit 20. The control circuit 20 generates the amplitude control signal in response to the amplitude detection signal.

For example, the amplitude adjusting circuit 13 is composed of an amplitude changing section 13a composed of a programmable gain amplifier (PGA). Also, the amplitude detecting circuit 14 is composed of a detecting section 14a, an AC-DC converting circuit 14b and an amplifier 14c. The detecting section 14a is composed of an operational amplifier to detect the voltage amplitude of the high frequency small amplitude signal. The AC-DC converting circuit 14b converts an output signal of the detecting section 14a into a direct current (DC) signal. The amplifier 14c amplifies a DC output signal of the AC-DC converting circuit 14b. It should be noted that the output signal of the amplifier 14c is supplied to the control circuit 20 and the amplitude control signal to the amplitude change section 13a is outputted from the control circuit 20.

Also, in the control unit 10 of the passenger detecting system, the current detecting circuit 15 is composed of a resistance 15a as an impedance element and an amplifier 15b. The resistance is provided between the amplitude control circuit 12 and the switching circuit 18 such the resistance is connected with the high frequency low voltage signal system circuit in series. The amplifier 15b is such as a differential amplifier which amplifies a voltage between terminals of the resistance 15a. The output side of the current detecting circuit 15 is connected with the control circuit 20 through the AC-DC converting circuit 16 and the amplifier 17. The output side of the resistance 15a of the current detecting circuit 15 is connected with the connector 19a to 19f through the switching circuit 18 to supply the displacement current.

The passenger detecting system formed in this way operates as follows.

First, when the high frequency low voltage signal is outputted from the oscillation circuit 11, the voltage amplitude of the high frequency low voltage signal is detected by the detecting section 14a of the amplitude detecting circuit 14. A detection signal from the detecting section 14a is converted into the direct current (DC) signal by the AC-DC converting circuit 14b, and is amplified by the amplifier 14c and then is supplied to the control circuit 20 as the amplitude detection signal. The control circuit 20 determines whether or not the detected voltage amplitude is set to the predetermined amplitude value, based on the amplitude detection signal. Then, the control circuit 20 outputs the amplitude control signal to the amplitude changing section 13a such that the voltage amplitude is corrected o adjusted to the predetermined amplitude value, when the amplitude value is different from the predetermined amplitude value. By this, the amplitude value of the high frequency low voltage signal is corrected to the predetermined amplitude value. Thereafter, through the cooperation operation of amplitude variable circuit 13 and the amplitude detecting circuit 14, the amplitude value of the high frequency low voltage signal is controlled to the constant amplitude value.

The high frequency low voltage signal having the predetermined amplitude value is supplied to the antenna electrodes 4 through the current detecting circuit 15, the switching circuit 18, and the connector 19a to 19f. As a result, the weak electric field is generated around the antenna electrodes 4. At this time, the switching circuit 18 performs the control of the opening and closing operation of each of the switches 18a to 18f in response to the switching control signal from the control circuit 20. First, only the switch 18a is closed, and next only the switch 18b is closed. Then, only the switch 18c is closed. In this manner, each of the switches 18 (18a, 18b, . . . , 18f) are sequentially closed. In this case, the remaining switches other than the closed switch are opened. Therefore, when each of the switches 18a to 18f is closed, the high frequency low voltage signal having the predetermined amplitude value is supplied to a corresponding one of the antenna electrodes 4a to 4f. The supplied signal flows through the current detecting circuit 15, the switches 18a to 18f, and the connector 19a to 19f. As a result, the weak electric field is generated around the antenna electrodes 4a to 4f, and the current flows with a level determined in accordance with the situation of the passenger on the passenger seat 1. That is, the current flows in accordance with the dielectric constants of portions of the passenger such as the back, the shoulder, the neck, and the head. Thus, the current flows in accordance to the contact area between each of the portions of the passenger such as the back, the shoulder, the neck and the head and a corresponding one of the antenna electrodes 4. This displacement current is detected by the current detecting circuit 15, is converted into the direct current signal by the AC-DC converting circuit 16, and is amplified by the amplifier 17 and is supplied to the control circuit 20 as a current detection data one after another.

Various threshold data such as THe, and TH1 to TH4 are previously stored in the control circuit 20. The threshold data THe is used to distinguish whether or not the seat 1 is empty, the threshold data TH1 is used to distinguish the head of the passenger, and the threshold data TH2, TH3 and TH4 are used to distinguish whether the passenger is a child or an adult.

That is, the threshold data THe is determined based on the summation S of the current detection data corresponding to the levels of the current lowing through the plurality of the antenna electrodes 4 (4a to 4f) when the child or adult passenger sits on the seat. This threshold data THe is specifically set to "20". A passenger is determined to exist on the seat 1 if the summation S of the current detection data is equal to or larger than "20" and it is determined that any passenger does not exist on the seat 1 if the summation S is smaller than "20".

Figure 9A:
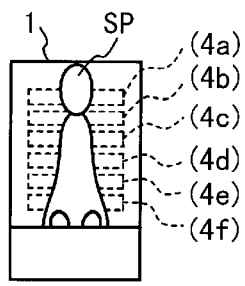
FIG. 9A is a diagram showing that a child is on a passenger seat.
Figure 9B:
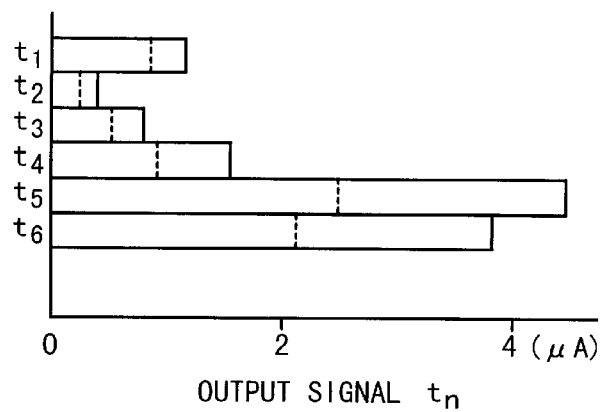
FIGS. 9B to 9D are a diagram showing a pattern of currents flowing through the respective antenna electrodes, a diagram showing a pattern of ratio data of the currents to a summation of the currents, and a diagram showing a pattern of ratio data of the currents other than the current for a head of the passenger, respectively.

The threshold data TH1 is used to distinguish the head of the passenger and is determined based on the following two facts. The first fact is that the current detection data for the current flowing through the antenna electrodes 4a to 4f are different from each other based on the contact areas between the antenna electrodes in the seat and the body portions of the passenger such as the head, the neck, the shoulder and the back. The second fact is that distribution patterns of the current detection data are different between a child and an adult. That is, as shown in FIG. 9B, in case of the passenger of the child, the current detection data corresponding to the body portions of the passenger such as the shoulder or a portion lower than the shoulder takes the highest value in the distribution pattern of the current detection data for the antenna electrodes 4c to 4f. The current detection data corresponding to the head of the passenger takes the next highest value. The current detection data for the antenna electrode 4b corresponding to the neck of the child is the lowest.

Figure 10A:
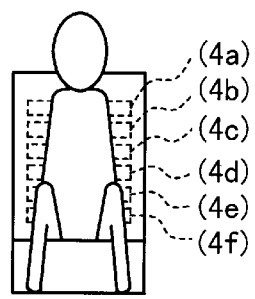
FIG. 10A is a diagram showing that an adult is on a passenger seat.
Figure 10B:
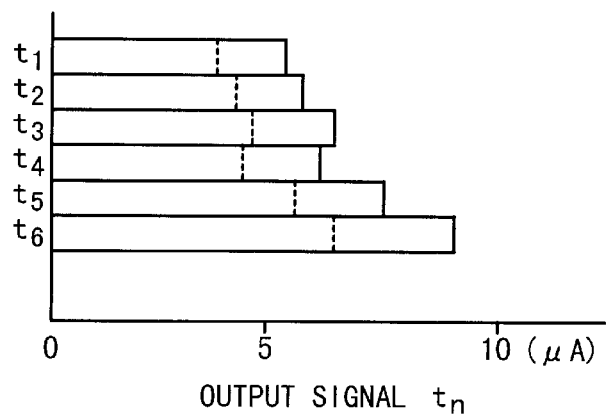
FIGS. 10B and 10C are a diagram showing a pattern of currents flowing through the respective antenna electrode, and a diagram showing a pattern of ratio data of the currents to a summation of the currents, respectively.

On the other hand, as shown in FIG. 10A, in case of the passenger of the adult, there is no antenna electrode corresponding to the head of the passenger, and the current detection data for the antenna electrodes 4a to 4f corresponding to the body portions of the passenger such as the neck of the passenger or a portion lower than the neck become higher in the order of the neck, the shoulder and the back of the passenger.

Figure 9C:
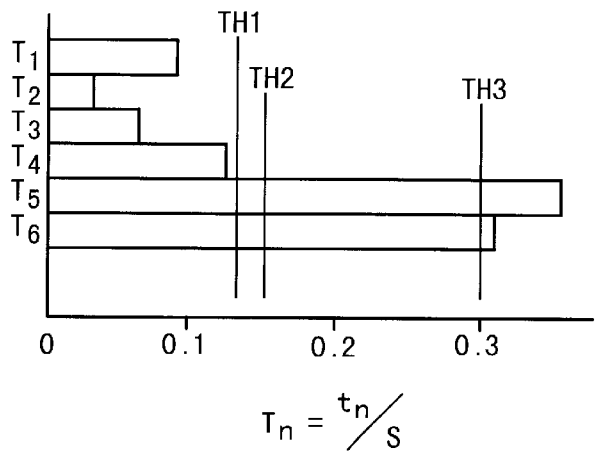
Figure 10C:
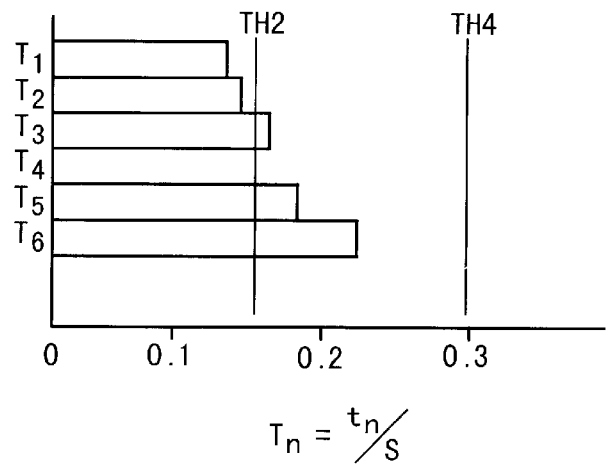

In this manner, the current detection data for the antenna electrodes are compared with each other. The threshold data TH1 is determined as a comparison reference for the current detection data with the lowest level. That is, this is because the head of the passenger is present in the neighborhood of the current detection data with the lowest level, i.e., on the upper side of the current detection data with the lowest level. The current detection data for the antenna electrodes are influenced by the thickness of the wear of the passenger, the figure of the passenger and the like. In order to eliminate the influence, the current detection data for each of the antenna electrodes is converted into a ratio data indicative of a ratio to the summation S of the current detection data, as shown in FIG. 9C and FIG. 10C. The threshold data TH1 is specifically set to "0.13". It is determined that the current detection data providing the ratio data smaller than "0.13" corresponds to the neck of the passenger, and the head of the passenger is located on the upper side of the antenna electrode.

Figure 9D:
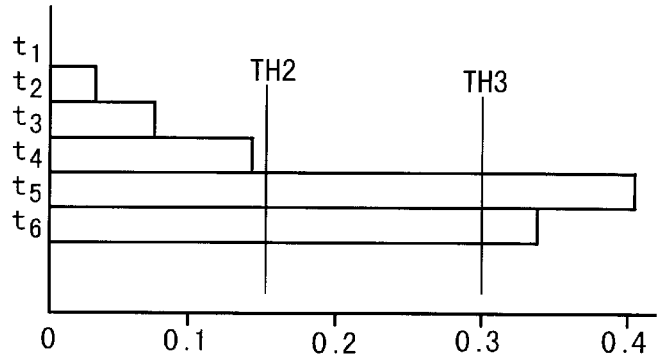

The threshold data TH2, TH3 and TH4 are used to distinguish whether the passenger is a child or an adult and are determined based on the difference between the child and the adult in the distribution pattern of the current detection data or the ratio data for the antenna electrodes, as shown in FIG. 9D and FIG. 10C. In case that the passenger is the child SP, the distribution pattern of the ratio data for the antenna electrodes 4a to 4d which correspond to the body portions of the passenger from the head to the back is small. On the other hand, the distribution pattern of the ratio data for the antenna electrodes 4e to 4f which correspond to the body portions of the passenger from the central part of the back and below is large. Also, in case that the passenger is the adult P, a partially large part of the distribution pattern of the ratio data is not present, unlike the case of the child.

Therefore, the passenger can be determined to be a child, if the ratio data for the antenna electrodes 4a to 4d are smaller than a predetermined level, and moreover either of the ratio data for the antenna electrodes 4e to 4f is larger than a predetermined level. Also, the passenger is determined to be an adult or gray, if all the ratio data for the antenna electrodes 4a to 4f are smaller than a predetermined level, in addition to unsatisfactory of the above condition. These predetermined levels are equivalent to the threshold data TH2, TH3 and TH4, respectively. Specifically, for example, the threshold data TH2 is set to "0.15", the threshold data TH3 is set to "0.3" and the threshold data TH4 is set to "0.3". Especially, because the head position of the child SP is not stationary, a portion of the distribution pattern of the ratio data corresponding to the head of the passenger is previously removed in the determining process. Therefore, as shown in FIG. 9D, the ratio of each current detection data to the summation Sum of the current detection data for the antenna electrodes other than the antenna electrodes corresponding to the head of the passenger is calculated. Then, the threshold data TH2 and TH3 are set based on the calculating result.

Figure 8:
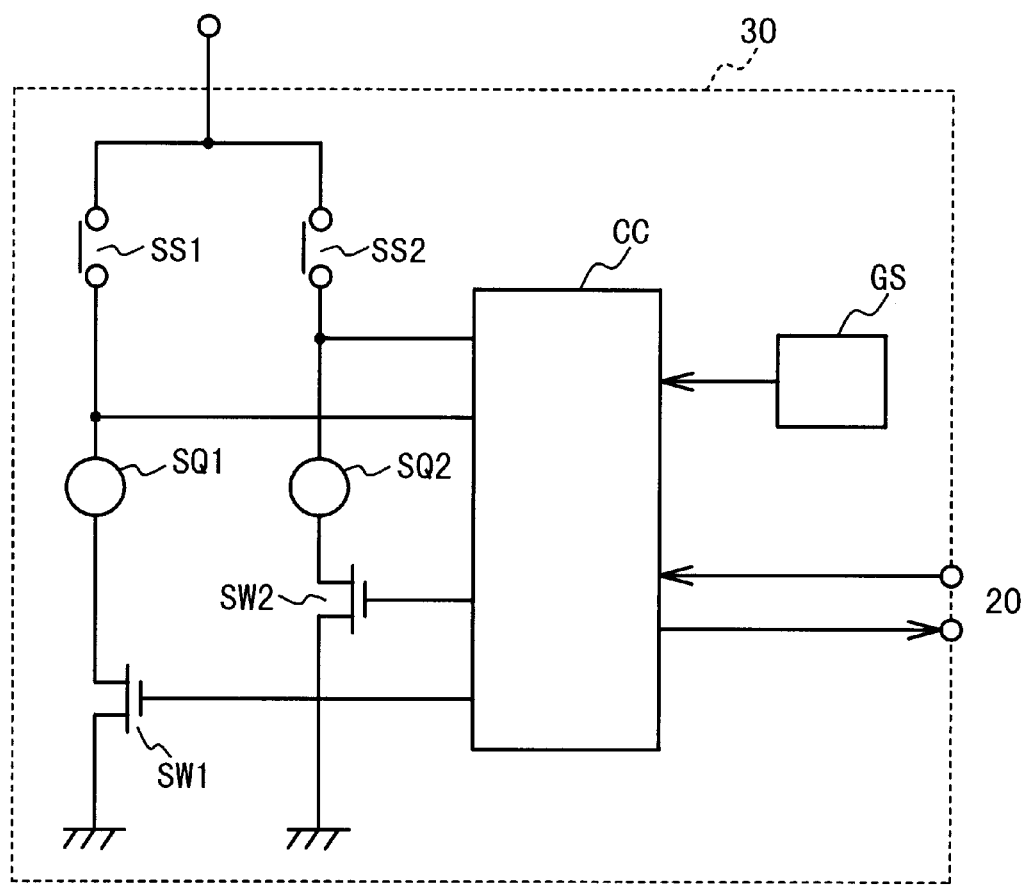
FIG. 8 is a circuit block diagram of a part of an air bag system shown in FIG. 7.

In this manner, the current detection data corresponding to the levels of the current flowing through the plurality of antenna electrodes 4a to 4f are taken into the control circuit 20 and are subjected to various calculating processes. For example, the summation S of the current detection data is compared with the threshold data THe, and it is determined whether or not the seat 1 is empty. Also, the ratio of each current detection data to the summation S is compared with the threshold data TH1 to distinguish the head position of the passenger. Moreover, the ratio of each current detection data to the summation Sum of the current detection data other than the current detection data corresponding to the head of the passenger is compared with the threshold data TH2, TH3 and TH4. Thus, it is determined whether or not the passenger is a child or an adult. The air bag control system 30 shown in FIG. 8 is controlled based on this determination result such that an air bag is expanded in response to the expansion control signal from the control circuit 20. That is, the expansion control signal is not supplied from the control circuit 20 to the gate of the semiconductor switching element SW2 on the side of the passenger seat in the control circuit CC of the air bag system 30, when it is determined that the passenger is a child. The expansion control signal is supplied from the control circuit 20 to the gate of the semiconductor switching element SW2 on the side of the passenger seat in the control circuit CC of the air bag system 30, when the passenger is an adult. Therefore, the air bag on the side of the passenger seat is not expanded in case that the passenger is the child, and is expanded in case that the passenger is the adult. It should be noted that the air bag on the side of the driver seat may be controlled in the same manner as that on the side of the passenger seat, or may be expanded irrespective of the situation on the side of the passenger seat.

Next, the processing flow of this passenger detecting system will be described with reference to FIG. 11 to FIG. 16.

Figure 11:
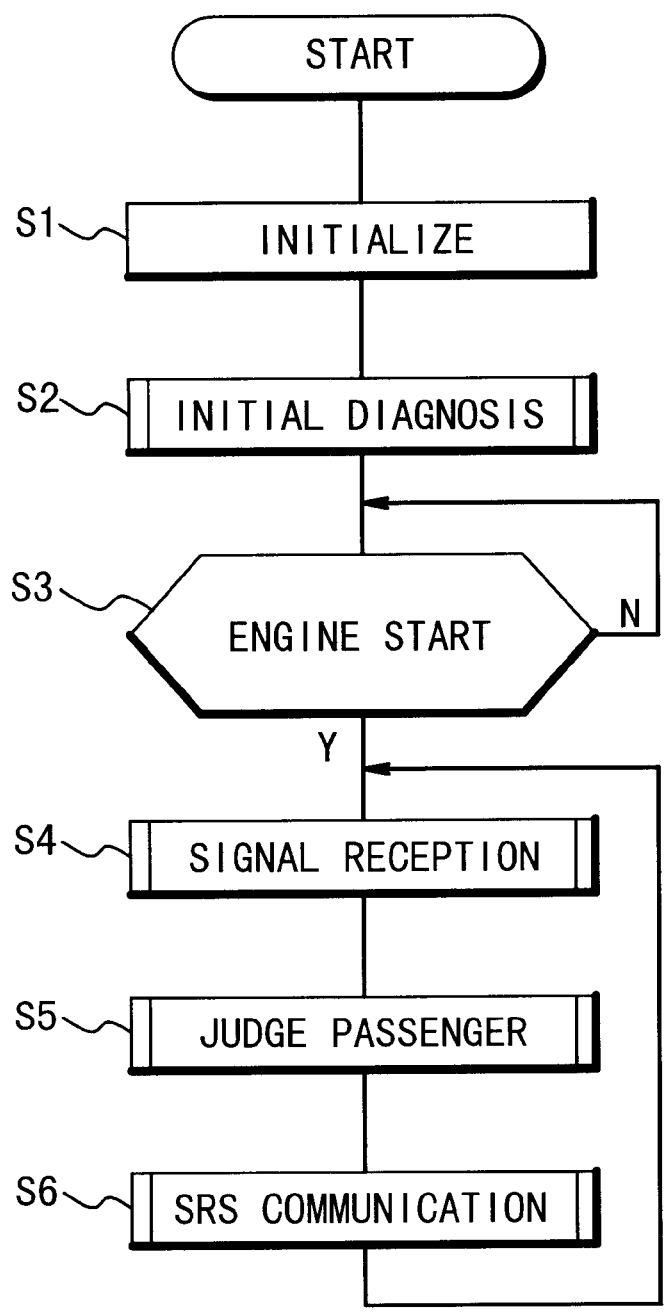
FIG. 11 is a flow chart of passenger detecting process by the passenger detecting system according to the first embodiment of the present invention.

First, as shown in FIG. 11, an ignition switch is turned on and is started. An initializing process is performed in a step S1 and the control advances to a step S2. In the step S2, an initial checking process to a communication system between the control circuit 20 and the air bag control system 30 is performed. Whether or not an engine is started is determined in a step S3. When the engine is determined to be started, the control advances to a step S4. When the engine is determined not to be started, the control executes the step S3 again.

In the step S4, a current detection data corresponding to the level of the current flowing based on the weak electric field generated in the neighborhood of each of the plurality of antenna electrodes 4 (4a to 4f) is selectively received by the control circuit 20. In a step S5, the determinations of whether a passenger exists on the passenger seat, where is the head position of the passenger, and whether the passenger is a child or an adult are performed based on the calculating process result of the received current detection data.

Moreover, in a step S6, an SRS communication is performed between the air bag control system (SRS) 30 and the control circuit 20 based on the determination result in the step S5. When the step S6 ends, the control returns to the step S4 again, and the processes from the step S4 to the step S6 are repeatedly performed. It should be noted that the step S3 can be omitted.

Figure 12:
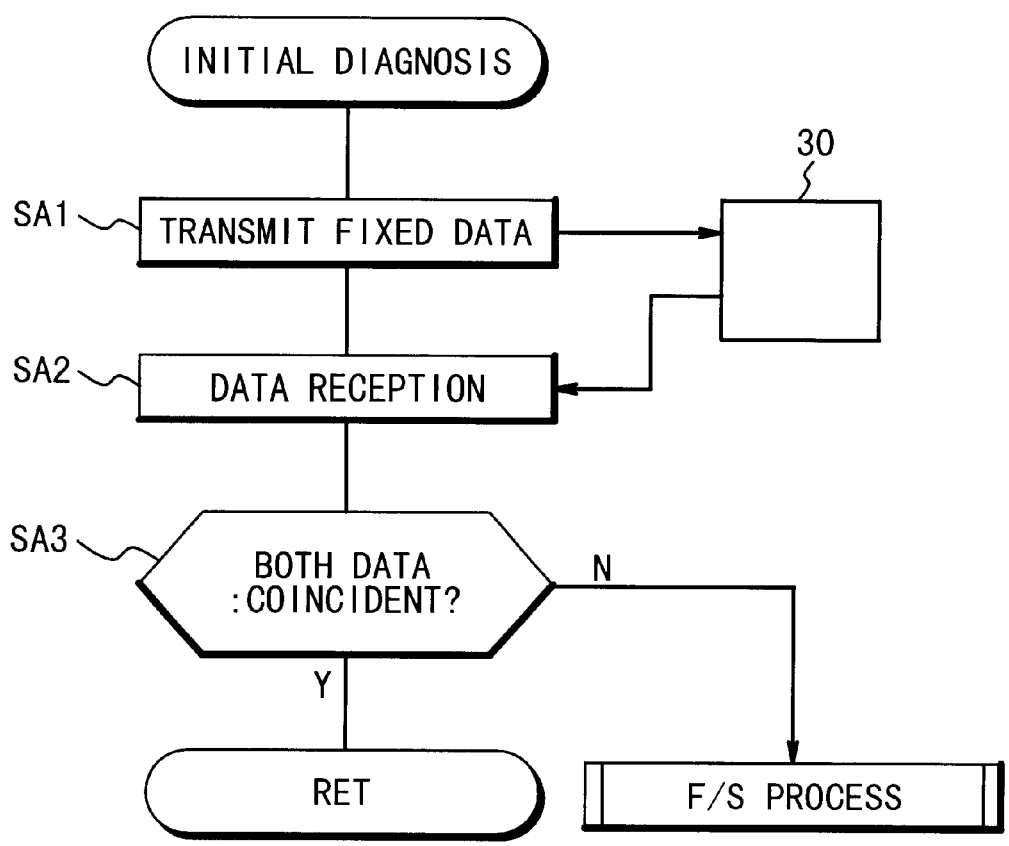
FIG. 12 is a flow chart showing an initial diagnostic process shown in FIG. 11.

For example, the initial checking process shown in FIG. 11 is performed to be shown in FIG. 12. First, in a step SA1, a predetermined data is transmitted from the control circuit 20 to the control circuit CC of the air bag control system 30. In a step SA2, the predetermined data is transmitted from the air bag control system 30 to the control circuit 20. In a step SA3, whether the predetermined data which has been transmitted from the control circuit 20 to the air bag control system 30 and the data receive from the air bag control system 30 are coincident with each other is determined. When both of the data are determined to be coincident each other, the control is continued. When both of the data are determined not to be coincident each other, it is determined to be any error in the communication system and a fail safe processing is performed. For example, a warning light and so on are lit up.

It should be noted that this initial diagnosis process may be performed by transmitting the predetermined data from the air bag control system 30 to the control circuit 20. In this case, the received data is transmitted from the control circuit 20 to the air bag control system 30, and then the control circuit CC of air bag system 30 determines whether or not the data received from the control circuit 20 is coincident with the predetermined data.

Figure 13:
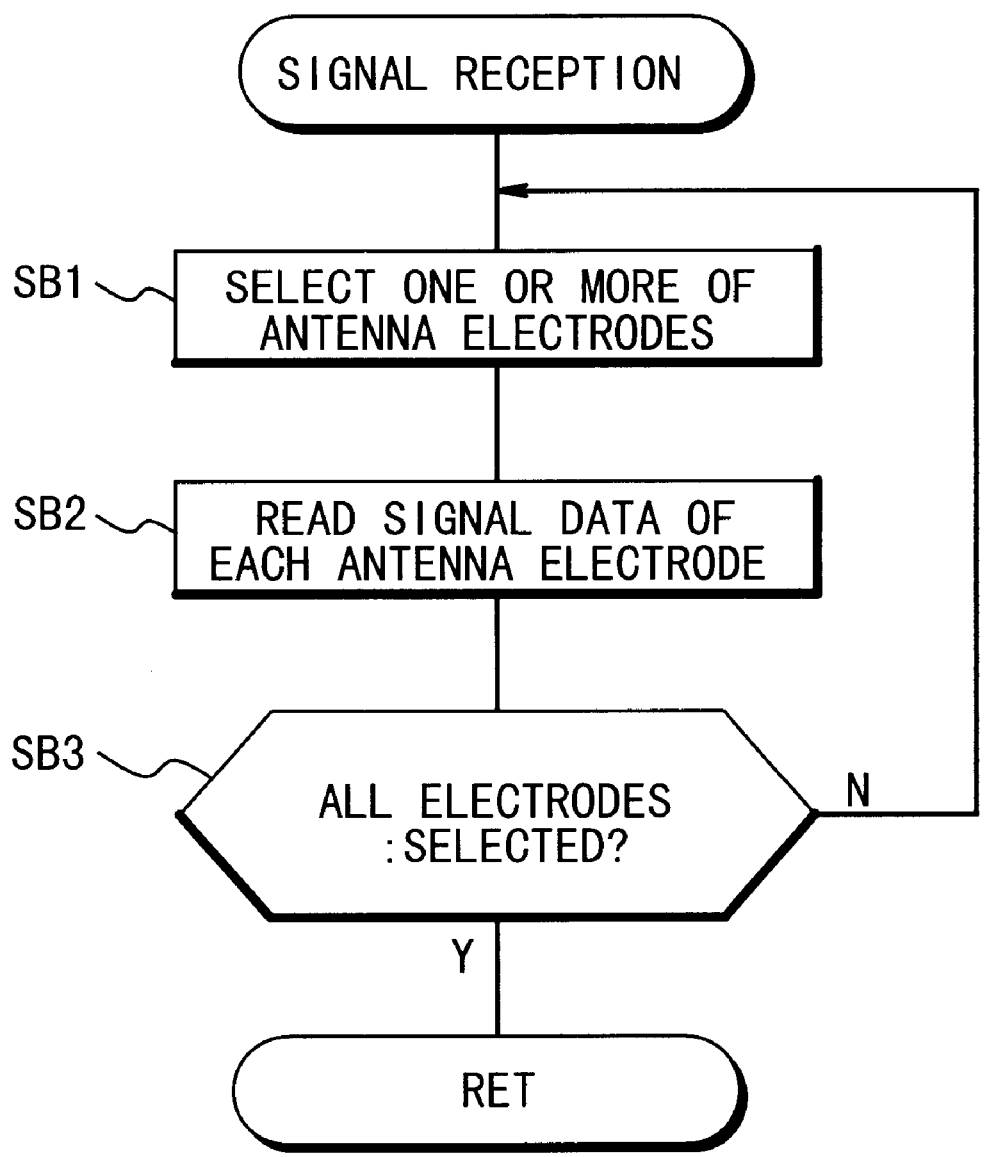
FIG. 13 is a flow chart showing a signal receiving process shown in FIG. 11.

For example, the signal receiving process in the step S4 of FIG. 11 is performed as shown in FIG. 13. First, in a step SB1, the switches 18a to 18f of the switching circuit 18 are selectively closed in order one by one based on the switching control signal from the control circuit 20 such that the antenna electrodes 4a, 4b, 4c, . . . , 4f are selected in order.

In a step SB2, the current detection data t1, t2, . . . , t6 corresponding to the levels of the displacement current flowing through the respective antenna electrodes 4a to 4f are taken in by the control circuit 20. Then, the control advances to step SB3.

In the step SB3, whether or not all the antenna electrodes 4a to 4f are connected in order is determined based on the selectively closing operation of the switches 18a to 18f of the switching circuit 18. When all the switches are determined to have ended, the control is continued to the passenger determining process. When all the switches are determined not to have ended, the control returns to the step SB1.

Figure 14:
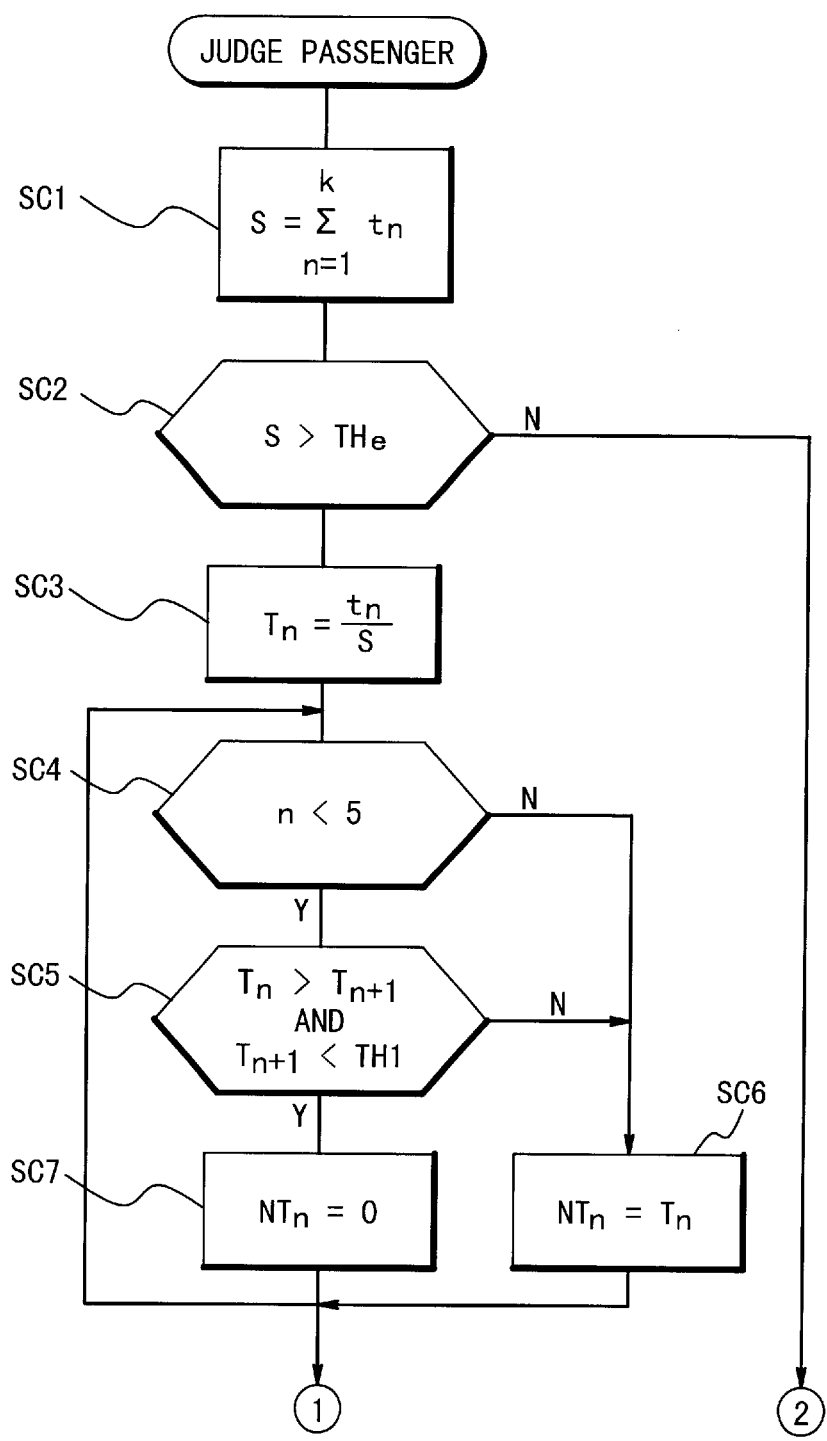
FIGS. 14 and 15 are a flow chart of a passenger determining process shown in FIG. 11.
Figure 15:
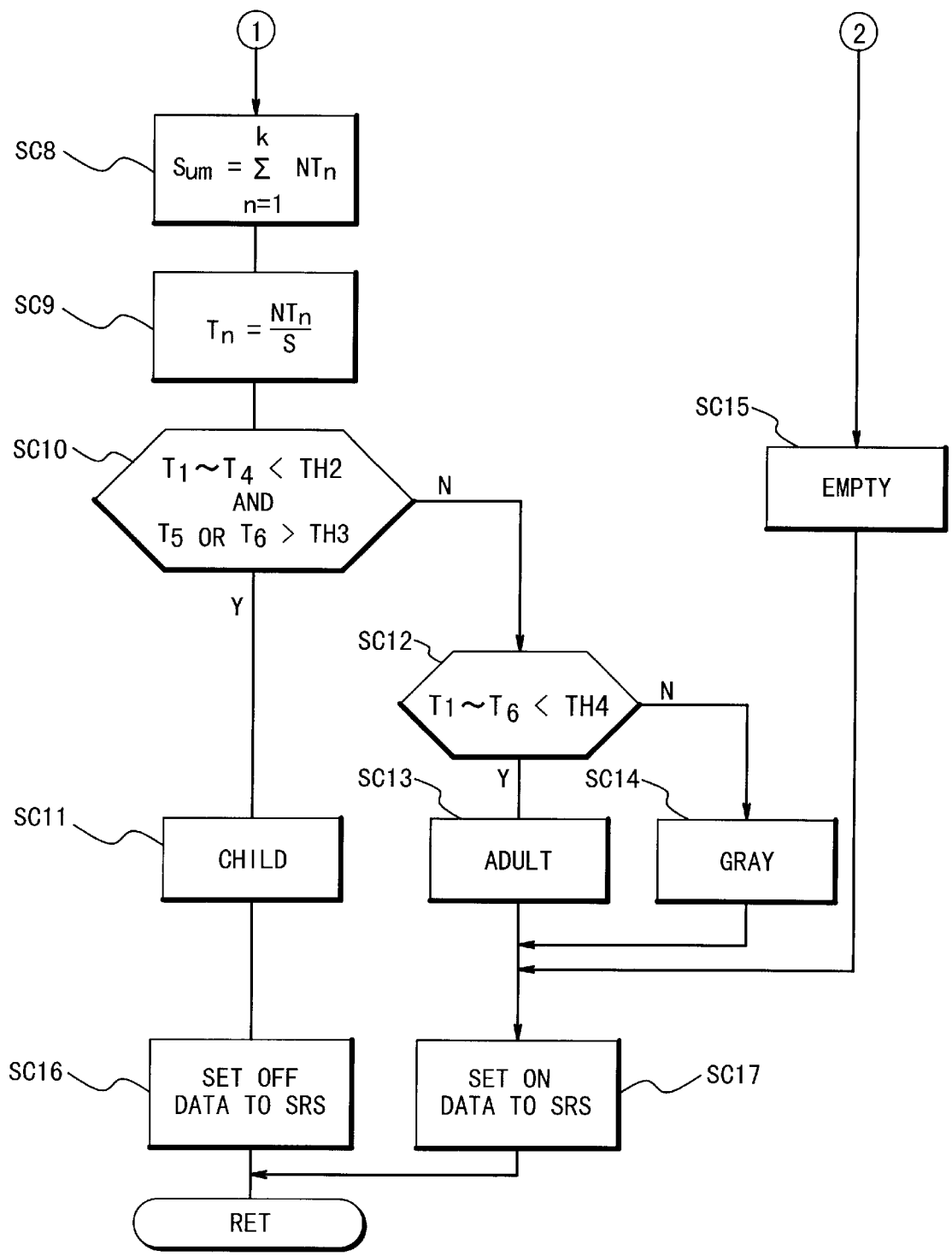

For example, a passenger determining process shown in FIG. 11 is performed as shown in FIG. 14 and FIG. 15.

First, in a step SC1, there is calculated the summation S of the current detection data tn (n=1 to k) corresponding to the levels of the current flowing through the respective selected ones of the antenna electrodes 4a to 4f. In this embodiment, the summation S of the six current detection data t1, t2, . . . , t6 for the antenna electrodes 4a to 4f is calculated.

In a step SC2, the summation S is compared with the threshold data THe to distinguish whether or not the summation S is larger than the threshold data THe, i.e., whether or not the seat is empty. When the summation S is determined larger than the threshold data THe, the control advances to a step SC3. When the summation S is determined to be not large, the control advances to a step SC15.

In the step SC3, a ratio data Tn (=T1, T2, . . . , T6) indicative of the ratio of the respective current detection data (t1, t2 . . . , t6) to the summation S are calculated and the control advances to step SC4.

In a step SC4, whether or not an antenna electrode number n is smaller than "5" is determined. When the antenna electrode number n is from "1" to "4", the antenna electrode number n is determined to be smaller than "5" and the control advances to step SC5. When the antenna electrode number n is "5" or "6", the antenna electrode number n is determined to be not smaller than "5", and the control advances to a step SC6.

In the step SC5, whether or not the ratio data $T_n$ is larger than $T_{n+1}$ and moreover whether or not the ratio data $T_{n+1}$ is smaller than the threshold data TH1 are determined. For example, as shown in FIG. 9C, in case of n=1, the ratio data $T_1$ is larger than the ratio data $T_2$ and the ratio data $T_2$ is smaller than the threshold data TH1. Therefore, it is determined that a neck is located in the antenna electrode 4b corresponding to the ratio data $T_2$ and that a head is located in the antenna electrode 4a adjacent to the antenna electrode 4b on the upper side. After that, the control advances to a step SC7.

In step SC7, as shown in FIG. 9D, the data NTn (data T1) is excluded as "0". It should be noted that when the antenna electrode number n is equal to or more than "2", because the above condition is not met in the step SC5, the control advances to the step SC6.

In the step SC6, the data NTn is made Tn (data T2, T3, . . . , T6).

In a step SC8, the summation Sum of the data Tn (=0, T2, T3, . . . , T6) is calculated over the data NTn (n from 1 to k (=6)) other than the data NT0 corresponding to the head. Then, the control advances to a step SC9.

In the step SC9, the ratio data (Tn=T1, T2, . . . , T6) of each of the ratio data NTn to the summation Sum is calculated. Then, the control advances to a step SC10.

In the step SC10, whether the ratio data T1 to T4 are smaller than the threshold data TH2 and whether the ratio data T5 or T6 is larger than the threshold data TH3 are determined. When the conditions are met, the passenger is determined to be a child in a step SC11, and when the conditions are not met, the control advances to a step SC12.

In the step SC12, whether all the ratio data T1 to T6 are smaller than the threshold data TH4 is determined. When this condition is met, the passenger is determined to be an adult in a step SC13. When this condition is not met, the control advances to a step SC14 and the passenger is determined to be in a gray zone to indicate that whether the passenger is the child or the adult can not be determined. For example, in FIG. 9D, because the ratio data T1 to T4 are smaller than the threshold data TH2 and moreover the ratio data T5 or T6 becomes larger than the threshold data TH3. Therefore, it can be determined that the passenger is the child. Also, in FIG. 10C, because all the ratio data T1 to T6 are smaller than the threshold data TH4, the above conditions are not met. Therefore, it can be determined that the passenger is the adult.

It should be noted that in the step SC2, when the summation S of the ratio data is not larger than the threshold data THe, a seat is determined to be empty in a step SC15.

When the passenger is determined to be a child in the step SC11, the control advances to a step SC16. In the step SC16, an OFF data is set for the expansion control signal such that the air bag of the air bag control system 30 is not expanded, and the control is continued to the SRS data communication flow.

When the passenger is determined to be the adult in the step 12, the control advances to step SC17. An ON data is set for the expansion control signal such that the air bag of the air bag control system 30 is expanded, and then the control is continued.

It should be noted that in case of the empty passenger seat, and in case of the gray zone, the control also advances to a step SC17. However, in case of the gray zone, the control may advance to the step SC16.

Figure 16:
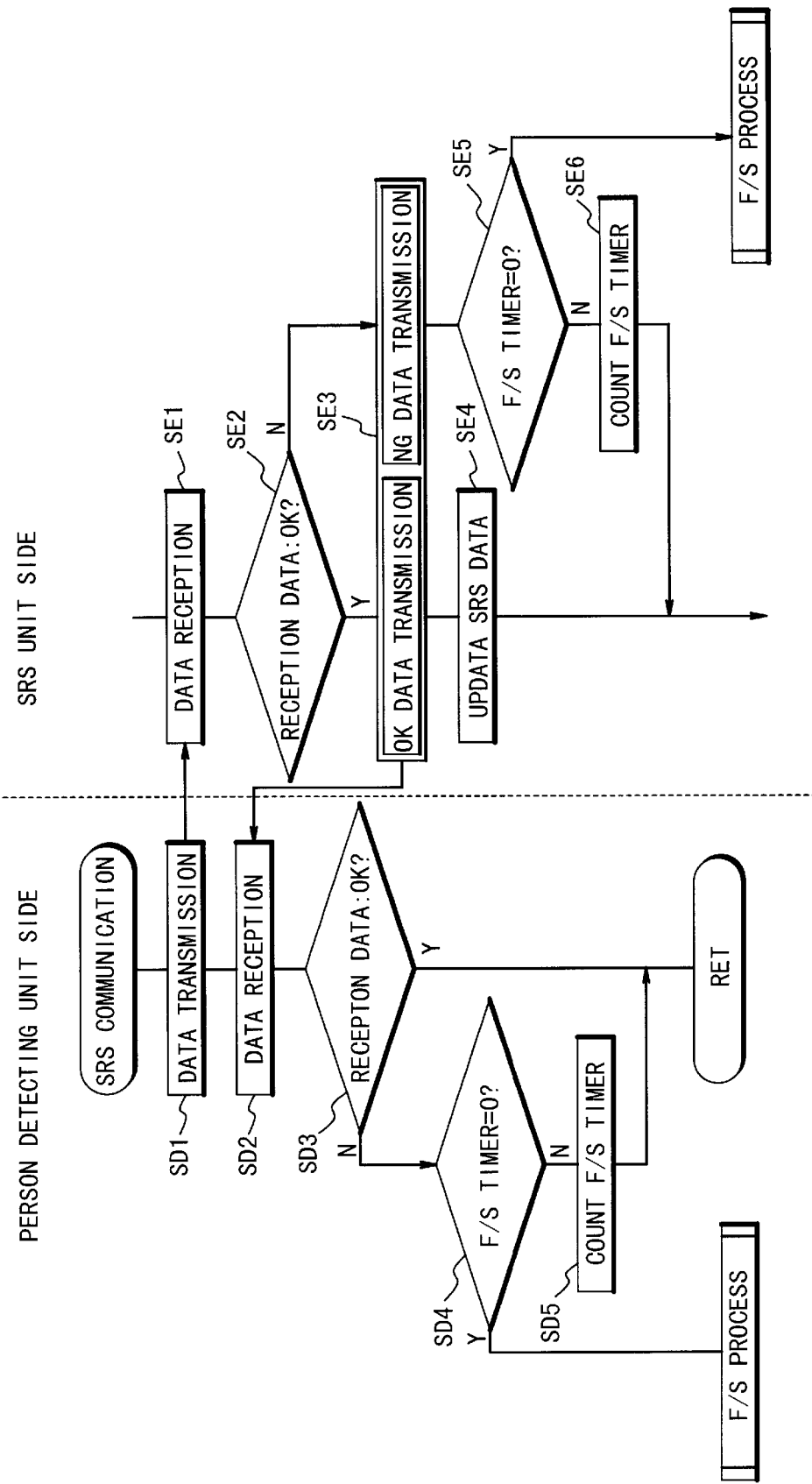
FIG. 16 is a flow chart of an SRS communication shown in FIG. 11.

For example, the SRS data communication in FIG. 11 is performed as shown in FIG. 16.

First, in a step SD1, the ON data or OFF data and a check data are transmitted from the side of control circuit 20 of the passenger detecting unit 10 to the side of the control circuit CC of the air bag control system 30 as the expansion control signal to control the expansion of the air bag of the air bag control system 30.

In a step SD2, an OK data or NG data and the check data for the ON data or the OFF data from the side of the air bag control system 30 are received. Then, the control advances to a step SD3.

In a step SD3, it is determined whether or not the ON/OFF data and the check data which have been transmitted from the side of the passenger detecting unit 10 to the side of the air bag control system 30 is sent back in the normal condition from the side of the air bag control system 30 to the side of the passenger detecting unit 10 again. When it is determined that the data are normal or there is not any error in the communication system, the control is continued. When it is determined to be any error in the communication system, the control advances to a step SD4 where it is determined whether or not the failsafe timer is zero. It should be noted that the error detecting operation in this communication system is executed three times, for example.

When the failsafe timer is determined to be "0", a fail safe process is performed, e.g., to light up a warning lamp.

Also, when the failsafe timer is determined to be not "0", the control advances to a step SD5. The counting down process of the failsafe timer is performed and the control is continued. On the other hand, in a step SE1, the control circuit CC of the air bag control system 30 receives the ON data or OFF data and the check data from the control circuit 20 of the passenger detecting unit.

In a step SE2, the check of the receive data is performed and it is determined whether or not the above data are normally received. Then, the control advances to a step SE3. In the step SE3, the OK data or NG data and the check data are transmitted from the control circuit CC of the air bag control system 30 to the passenger detecting unit 10.

When it is determined to be not any error in the communication system in the step SE2, the control advances to a step SE4 via the transmission of the OK data in step SE3.

In the step SE4, data on the side of the air bag control system 30 is updated based on the OK data. By this, the air bag is updated to either of the expansion allowed state or expansion inhibited state.

Also, when it is determined to be any error in the communication system in the step SE2, the control advances to a step SE5 via the transmission of the NG data in step SE3. In the step SE5, it is determined whether or not the failsafe timer is "0". It should be noted that the error detecting operation in this communication system is possibly executed to three times. When the failsafe timer is determined to be "0", a fail safe process is performed, e.g., to light up a warning lamp.

Also, when the failsafe timer is determined not to be "0", the control advances to a step SE6. In the step SE6, the count down process of the failsafe timer is performed and then the control is continued.

According to this embodiment, the displacement current flowing based on the weak electric field is generated in response to application of the high frequency low voltage signal to each of the plurality of band-shaped antenna electrodes 4 (4a to 4f) which are arranged in the back supporting section 1b of the seat 1. Each of the current detection data corresponding to the current is converted into the ratio data to the summation S. The threshold data THe, TH2, TH3, and TH4 are set to the ratio data, and are used for determination of the existence or non-existence of the passenger. Therefore, for example, even if the wear of the passenger becomes thick so that the absolute value of each current detection data changes as show by the dotted line in FIGS. 9A and 9B and FIGS. 10A and 10B, the ratio data changes hardly as shown in FIGS. 9C and 9D and FIG. 10C.

Therefore, even if the absolute value of each current detection data changes depending upon the figure of the passenger in addition to the thickness of the wear of the passenger and so on, it is not necessary to change the threshold data for the determination of the existence or non-existence of the passenger every time of detection. Thus, the determination with high reliability can be expected.

The current flows depending upon the difference of the contact area between the body portions of the passenger on the seat 1 such as the head, the neck, the shoulder, and the back and corresponding ones of the antenna electrodes 4 (4*a* to 4*f*). Therefore, if the current detection data corresponding to the levels of the displacement current are compared with each other, the position of the neck of the passenger can be easily detected. Because the head position is approximately related to the sitting height of the passenger, it is accurately determined based on the detected position whether or not the passenger is a child.

Especially, the head position of the child is not stationary. Therefore, the current detection data for the head tends to lack in the reliability. Therefore, a part of the current detection data for the head data is removed from all the current detection data before the determination of whether or not the passenger is a child or an adult. In this case, it is possible to accurately determine whether or not the passenger is the child, without being too much influenced by the head attitude of the passenger. Also, each of the current detection data is converted into the ratio data indicative of the ratio of the current detection data to the summation Sum, as described above. The reliability of the determination can be more improved without being influenced by the change of the absolute value of each current detection data based on the wear, the figure and so on of the passenger. Therefore, the air bag of the air bag system can be surely set to either of the expansion allowed state or the expansion inhibited state based on the accurate determination passenger. Thus, the unnecessary expansion can be prevented.

It should be noted that the present invention is not limited based on only by the above embodiment. The number of antenna electrodes in the seat may be changed adequately. Also, the oscillation circuit may generate a high frequency rectangular wave signal through a switching operation in response to the switching control signal from the control circuit in place of the high frequency low voltage signal. In this case, only the positive power supply may be used.

Also, the frequency of the oscillation signal by the oscillation circuit may be set to a suitable frequency other than 100 KHz, and a voltage outside of the range of 5 to 12 V may be used.

Also, the amplitude control circuit 12 may be omitted depending upon the precision of the system power supply, the function required in the system and so on.

Also, in the passenger determining process, the step SC2 and the steps SC4 to SC9 may be omitted. When the condition of step SC10 is not met in the adult determining process, the passenger may be determined as an adult.

Moreover, the antenna electrodes may be dispersedly arranged in the seat section, in addition to the seat support section. Also, the antenna electrodes may be provided up to the end portion of the seat 1. In this case, even when the child is sleeping, the child can be detected so that the expansion of the side air bag can be controlled.

As above mentioned, according to the present invention, each of the current detection data for the levels of the current flowing based on the weak electric field generated on the plurality of band-shaped antenna electrodes is converted into the ratio data indicative of the ratio to the summation.

Moreover, the threshold data for the determination of the passenger are set with respect to such ratio data. Therefore, even if the absolute value of each output signal changes depending upon the wear, the figure and so on of the passenger change, the ratio data changes hardly. Therefore, it is not necessary to update the threshold data for every determination process regardless of the thickness of the wear, the figure of the passenger and so on. As a result, the determination with high reliability can be expected.

Also, the plurality of band-shaped antenna electrodes are arranged in the back supporting section of the seat in the present invention. Therefore, the current with the level determined depending upon the difference of the contact area between the seat and each body portion of the passenger such as the head, the neck, the shoulder, and the back flows through the antenna electrodes, when the passenger sits on the seat. Therefore, by comparing the current detection data for the respective current levels, the head position can be easily detected based on the position of the neck. Thus, it can be easily determined whether or not the passenger is a child, based on the head position, because the head position is approximately related with the sitting height.

Next, the passenger detecting system according to the second embodiment of the present invention will be described with reference to FIG. 17 and FIGS. 18A and 18B.

Figure 17:
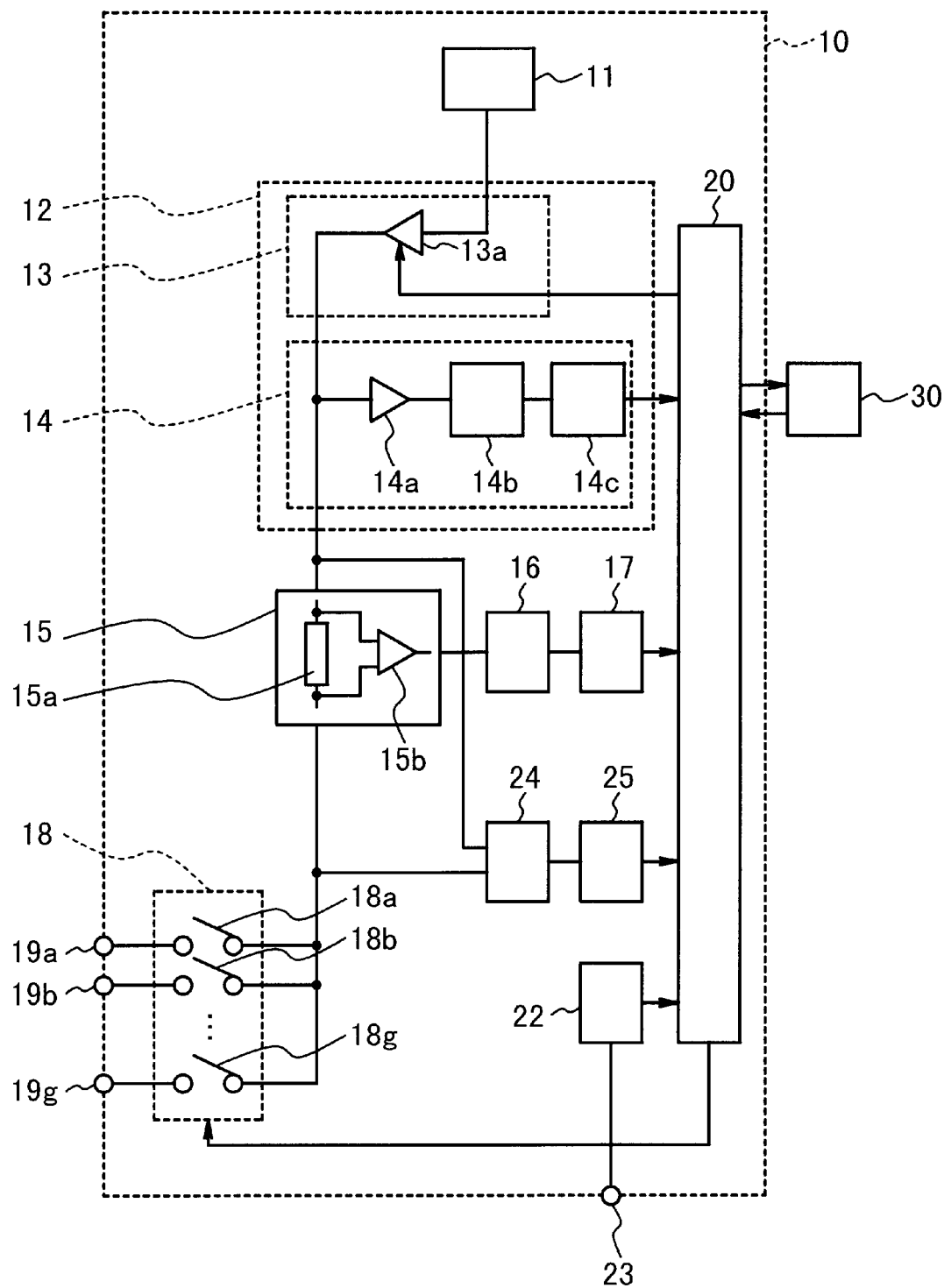
FIG. 17 is a block diagram showing the structure of the passenger detecting system according to a second embodiment of the present invention.

As shown in FIG. 17, the control unit 10 is composed of an oscillation circuit 11, an amplitude control circuit 12, a current detecting circuit 15, an AC-DC converting circuit 16, an amplifier 17, a switching circuit 18, connectors 19 (19*a*, . . . , 19*f*), a control circuit 20, a connector 23, a power supply circuit 22, a phase difference detecting circuit 24, and an amplifier 25.

For example, the oscillation circuit 11 generates a high frequency low voltage signal having amplitude of about 5 to 12 V and the frequency of about 120 KHz. Weak electric field is generated by the high frequency low voltage signal in the neighborhood of the antenna electrode 4. The amplitude control circuit 12 controls the voltage amplitude of the high frequency low voltage signal from the oscillation circuit 11 to an approximately constant value in response to an amplitude control signal. The current detecting circuit 15 detects a displacement current of the high frequency low voltage signal. The AC-DC converting circuit 16 converts an output signal of the current detecting circuit 15 into a direct current (DC) signal. The amplifier 17 amplifies the output DC signal from the AC-DC converting circuit 16 to output the current detection data. The switching circuit 18 for the antenna electrodes 4*a* to 4*g* has a plurality of switches 18 (18*a*, 18*b*, . . . , 18*g*) and is connected with the current detecting circuit 15. The connectors 19 (19*a*, . . . , 19*g*) are connected with the switches 18*a* to 18*g* of the switching circuit 18 and are arranged in the housing of the control unit. The phase difference detecting circuit 24 is connected with the current detecting circuit 15 on the side of the amplitude control circuit and on the side of the antenna electrodes. The phase difference detecting circuit 24 detects a phase difference between the high frequency low voltage signal from the oscillation circuit 11 and the displacement current signal to the antenna electrodes. The amplifier 25 amplifies an output signal from the phase difference detecting circuit 24 to output a phase difference data to the control circuit 20. The connector 23 is arranged in the housing and is connected with the battery power supply (not shown). The power supply circuit 22 is connected with the connector 23 to supply the power to elements of the control unit 10. The control circuit 20 of the passenger detecting unit 10 contain an MPU and an external memory, and is connected with an air bag control system 30 shown in FIG. 8. It should be noted that the selective switching between the switches 18*a* to 18*g* of the switching circuit 18 is performed based on a switching control signal from the control circuit 20.

In the control unit 10, the amplitude control circuit 12 is composed of an amplitude adjusting circuit 13 and an amplitude detecting circuit 14. The amplitude adjusting circuit 13 variably changes or controls the voltage amplitude of the high frequency low voltage signal in response to an amplitude control signal from the control circuit 20. The amplitude detecting circuit 14 detects the voltage amplitude of the high frequency low voltage signal to output an amplitude detection signal to the control circuit 20. The control circuit 20 dynamically generates the amplitude control signal in response to the amplitude detection signal. For example, the amplitude adjusting circuit 13 is composed of an amplitude changing section 13a composed of a programmable gain amplifier (PGA). Also, the amplitude detecting circuit 14 is composed of a detecting section 14a, an AC-DC converting circuit 14b and an amplifier 14c. The detecting section 14a is composed of an operational amplifier to detect the voltage amplitude of the high frequency low voltage signal. The AC-DC converting circuit 14b converts an output signal of the detecting section 14a into a direct current (DC) signal. The amplifier 14c amplifies a DC output signal of the AC-DC converting circuit 14b. It should be noted that the amplitude detection signal of the amplifier 14c is supplied to the control circuit 20 and the amplitude control signal is outputted from the control circuit 20 to the amplitude change section 13a.

Also, in the control unit 10, the current detecting circuit 15 is composed of a resistance 15a and an amplifier 15b. The resistance 15a is an impedance element connected with the oscillation circuit 11 in series, and the amplifier 15b such as a differential amplifier amplifies a voltage between terminals of the resistance 15a. The output side of the current detecting circuit 15 is connected with the control circuit 20 through the AC-DC converting circuit 16 and the amplifier 17. The output side of the resistance 15a of the current detecting circuit 15 is connected with the connector 19a to 19g through the switching circuit 18.

Figure 18A:
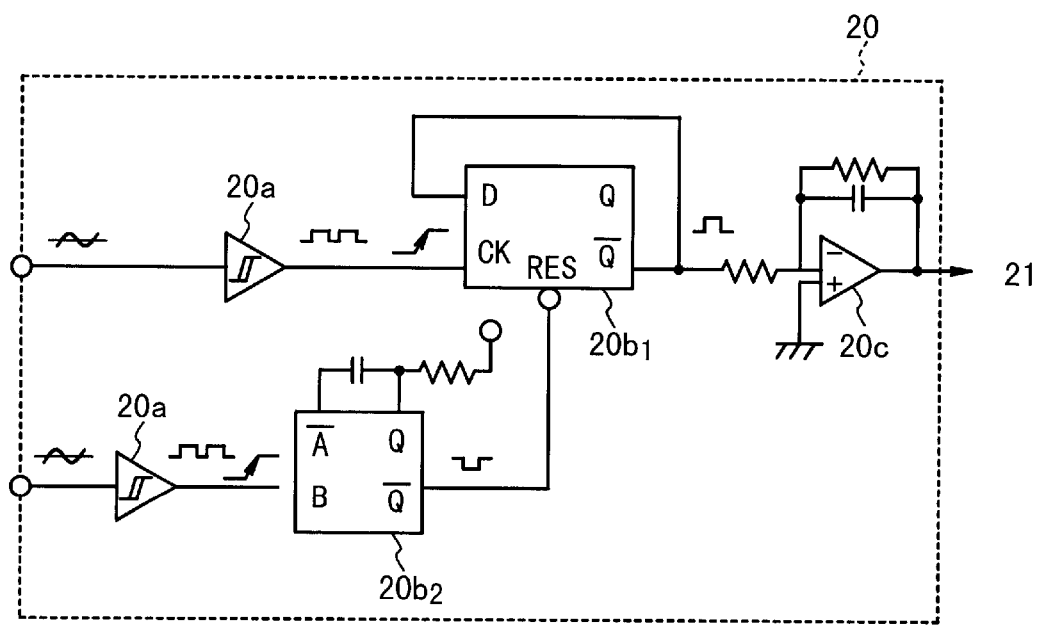
FIG. 18A is a block diagram showing the structure of a phase difference detecting circuit shown in FIG. 17.
Figure 18B:
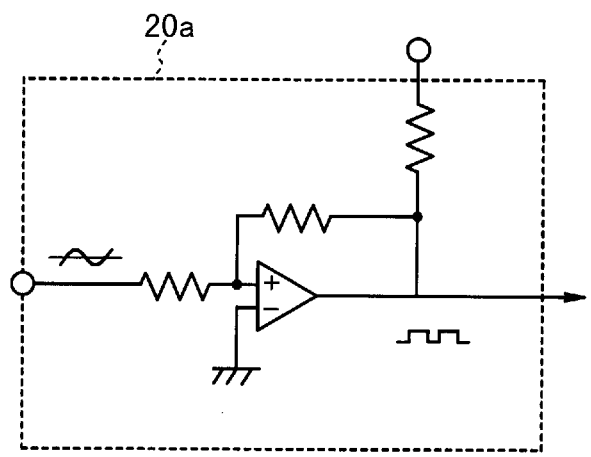
FIG. 18B is a circuit block diagram-showing the structure of a waveform shaping circuit.

Moreover, as shown in FIG. 18A, the phase difference detecting circuit 24 is composed of waveform shaping circuits 20a and 20a, a first flip-flop circuit 20b1, a second flip-flop circuit 20b2, and an integrating circuit 20c. The waveform shaping circuits 20a and 20a shape the high frequency low voltage signal from the oscillation circuit 11 and the output signal to the antenna electrodes 4 (4a to 4g) into square signals, respectively. Moreover, as shown in FIG. 18B, the waveform shaping circuit 20a is composed of resistances and a differential amplifier. It should be noted that the waveform shaping circuits 20a can be omitted, when the high frequency low voltage signal from the oscillation circuit 11 is generated to have a square or rectangular waveform through a switching operation using a power supply of +5 V of the power supply circuit 24.

The passenger detecting system formed in this way operates as follows.

First, when the high frequency low voltage signal from the oscillation circuit 11 is outputted, the voltage amplitude of the high frequency low voltage signal is detected by the detecting section 14a of the amplitude detecting circuit 14. A detection signal from the detecting section 14a is converted into the direct current (DC) signal by the AC-DC converting circuit 14b, and is amplified by the amplifier 14c and then is supplied to the control circuit 20 as the amplitude detection signal. The control circuit 20 determines whether or not the detected voltage amplitude is set to the predetermined amplitude value, based on the amplitude detection signal. The control circuit 20 outputs the amplitude control signal to the amplitude changing section 13a such that the voltage amplitude is corrected to the predetermined amplitude value, when the amplitude value is different from the predetermined amplitude value. By this, the amplitude value of the high frequency low voltage signal is corrected to the predetermined amplitude value. Thereafter, through the cooperation operation of amplitude adjusting circuit 13 and the amplitude detecting circuit 14, the amplitude value of the high frequency low voltage signal is controlled to the constant amplitude value.

The high frequency low voltage signal having the predetermined amplitude value is supplied to the antenna electrodes 4 through the current detecting circuit 15, the switching circuit 18, and the connector 19a to 19g. As a result, the weak electric field is generated around the antenna electrodes 4. At this time, the switching circuit 18 performs the control of the opening and closing in response to the switching control signal from the control circuit 20. First, only the switch 18a is closed, and next only the switch 18b is closed. Then, only the switch 18c is closed. Each of the switches 18 (18a, 18b, . . . , 18f) is sequentially closed. In this case, the remaining switches other than the closed switch are opened. Therefore, when each of the switches 18a to 18g is closed, the high frequency low voltage signal having the predetermined amplitude value is supplied to a corresponding one of the antenna electrodes 4a to 4g. Thus, the voltage signal is supplied through the current detecting circuit 15, the switches 18a to 18g, and the connector 19a to 19g. As a result, the weak electric field is generated around the antenna electrodes 4a to 4g, and the current flows with a level determined in accordance with the situation of the passenger on the passenger seat 1. That is, the current flows in accordance with the dielectric constants of the body portions of the passenger such as the back, the shoulder, the neck, and the head. That is, the displacement current flows in accordance to the contact area between each of the body portion of the passenger such as the back, the shoulder, the neck, and the head and a corresponding one of the antenna electrodes. This current is detected by the current detecting circuit 15, is converted into the direct current signal by the AC-DC converting circuit 16, and is amplified by the amplifier 17 and is supplied to the control circuit 20 as the current detection data one after another.

Figure 19:
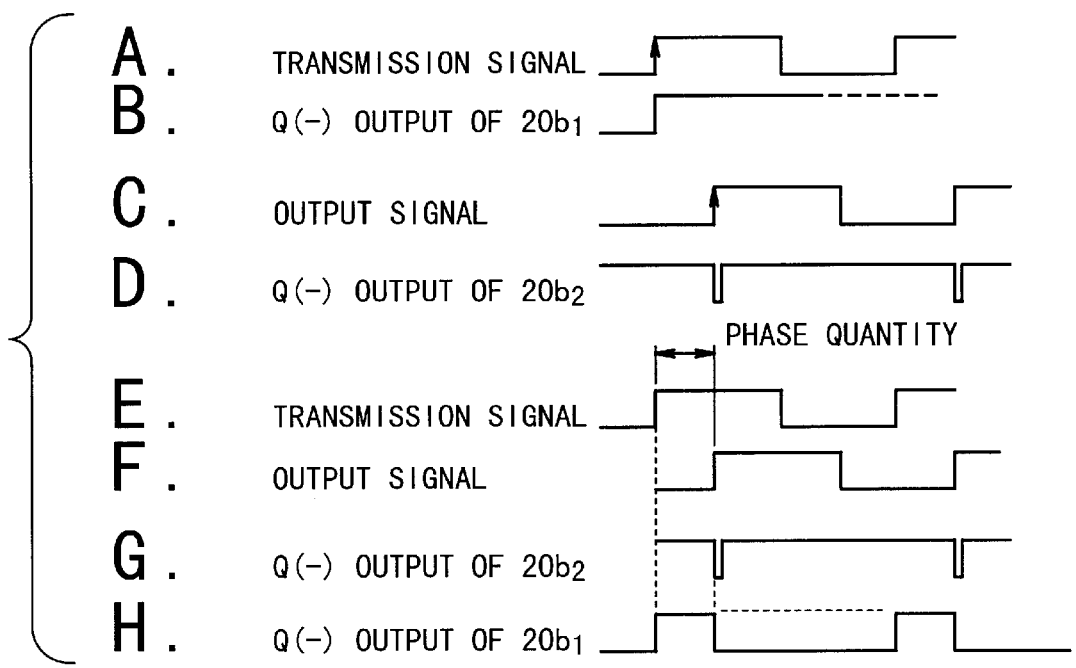
FIGS. 19A to 19H are timing charts to explain the phase difference detecting circuit shown in FIG. 18A.

On the other hand, the voltage signal between the both edges of the current detecting circuit 15 are supplied to the phase difference detecting circuit 20. That is, the high frequency low voltage signal from the oscillation circuit 11 on the side of the amplitude control circuit and an output signal to the antenna electrode 4 on the side of the switching circuit are supplied to the phase difference detecting circuit 20. At this time, the sine wave signals are shaped into a square wave by the waveform shaping circuits 20a and are outputted to the first flip-flop circuit 20b1 and the second flip-flop circuit 20b2, as shown in FIGS. 19A and 19C. The rising edge of the square wave signal indicated by an arrow in the figure of the transmitting side is detected at the terminal CK of the first flip-flop circuit 20b1 to set the terminal QB to a high level, as shown in FIG. 19B. On the other hand, the rising edge of the square wave signal indicated by an arrow is detected at the terminal B of the second flip-flop circuit 20b2 so that one shot output with a low level is outputted from the terminal QB, as shown in FIG. 19D. The one shot output is supplied to the terminal RES of the first flip-flop circuit 20b1. As a result, the output of the terminal QB of the first flip-flop circuit 20b1 is inverted to the low level, as shown in FIG. 19H. This output passes through the integrating circuit 24c to be converted into the voltage indicative of a phase quantity or a phase difference and is supplied to the control circuit 22 through the amplifier 21 as the phase difference data. It should be noted that the detecting operation of this phase quantity corresponds to the detecting operation of the outputted current to each of the antenna electrodes by the current detecting circuit 15 in order.

Figure 20A:
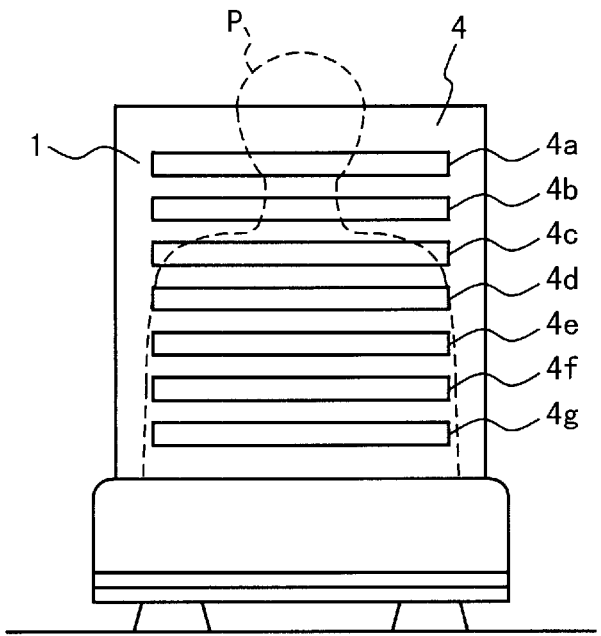
FIGS. 20A and 20B are diagrams showing an adult and a child on the passenger seat, respectively.
Figure 20B:
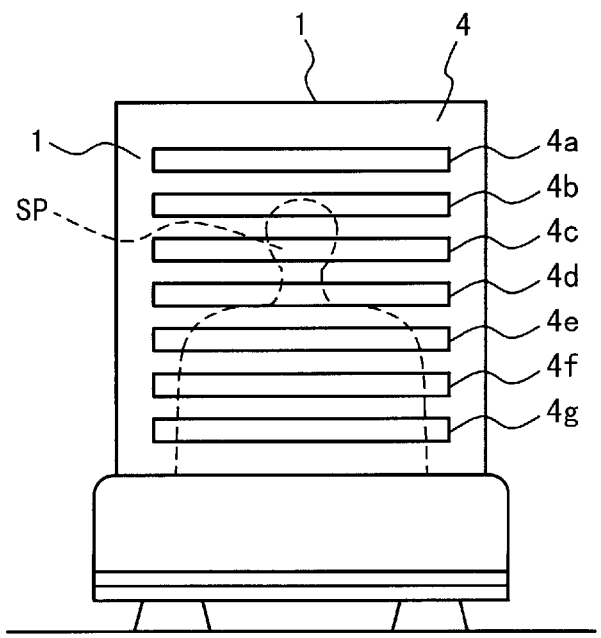

In the memory unit of the control circuit 20 are previously stored a threshold data with respect to a head position of the passenger, and a threshold data with respect to a phase difference between the high frequency low voltage signal and the displacement current signal to the antenna electrode. That is, the threshold data with respect of the head position is set as follows. For example, as shown in FIGS. 20A and 20B, the levels of the current to the antenna electrode are different from each other due to difference in dielectric constant between the body portions of the passenger such as the head, the neck, the shoulder and the back, when the passenger of a child SP or an adult P sits on the seat 1. In this case, the level of the current to the antenna electrode takes the highest in the shoulder and the portion lower than the shoulder. Next, the current level to the antenna electrode takes next the highest in the head of the passenger. The current level is the lowest in the neck of the passenger. Using a large difference between the current level for the shoulder and the current level for the neck, the shoulder line can be detected, and it is determined that the head is located above the shoulder line. Therefore, a middle position between the position or height of the antenna electrode corresponding to the adult shoulder and the position or height of the antenna electrode corresponding to the child shoulder is set as the threshold data in relation to the head position. This threshold data is the antenna electrode 4c for the shoulder line in case of the passenger P of the adult shown in FIG. 20A, and the antenna electrode 4e for the shoulder line in case of the passenger SP of the child shown in FIG. 20B. Therefore, when the shoulder line exists above the antenna electrode 4d as a middle position, the passenger is determined to be an adult. As a specific threshold data, the threshold data is set to "4" for a lower portion of the back supporting section 1b from the antenna electrode 4d to the antenna electrode 4g.

On the other hand, a phase difference between an average of phase difference detected by the phase difference detecting circuit 20 when the passenger is on the seat 1 and an average phase difference by the phase difference detecting circuit 20 when a substance is on the seat 1 is set as the threshold data used to determine whether or not the passenger is on the seat 1. It should be noted that when an upper limit and a lower limit can be set as the threshold data depending upon the state of the seat, for example, a wet state, it is determined that a passenger is on the seat 1, if the phase difference data exists in the range. Therefore, the control circuit 20 compares the threshold data with respect to the head position and the threshold data with respect to the phase difference. The head position data and the phase difference data have been determined based on the current detection data and it can be accurately determined whether or not the passenger on the seat 1 is a child or an adult.

In this way, a data indicative of the head position is taken in the memory of the control circuit 20. Also, the threshold data is stored with respect to the head position which is previously stored in the memory of the control circuit 22. The head position data is compared with the threshold data with respect to the head position. For example, as shown in FIG. 20A, when the number of antenna electrodes from the antenna electrode 4g to the antenna electrode 4c corresponding to the shoulder line is "5", which is larger than "4", any passenger is determined to be the adult P. By this, the air bag of the air bag control system 30 is set to the expansion allowed state in the in response to an expansion control signal from the control circuit 20. Oppositely, as shown in FIG. 20B, when the number of antenna electrodes from the antenna electrode 4g to the antenna electrode 4e corresponding to the shoulder line is "3", which is smaller than "4", a passenger is determined to be a child SP. By this, the air bag of the air bag system 30 is set to the expansion inhibited state in response to the expansion control signal from the control circuit 20.

According to this embodiment, the plurality of band-shaped antenna electrodes 4 (4a to 4g) are arranged to extend in the horizontal direction over the back supporting section 1b of the seat 1 and to be apart from each other in the vertical direction. The high frequency low voltage is applied to the antenna electrodes in order so that the weak electric field is generated. Therefore, the current flows through the antenna electrodes 4 (4a to 4g) depending upon dielectric constant of the body portions of a passenger on the seat 1 such as the head, the neck, the shoulder, and the back. Therefore, it is easily possible to extract the shoulder line from these currents to detect a head position and to detect whether the passenger on the seat is an adult.

Also, the plurality of band-shaped antenna electrodes 4 (4a to 4g) are arranged to extend in the horizontal direction over the back supporting section 1b of the seat 1. Therefore, the head position can be precisely detected as in the case that the head is located in a regular position, even if the attitude of the passenger on the seat 1 rather shifts in the direction of the side of the seat. Therefore, the head position of the passenger can be accurately detected without being too much influenced by the attitude of the passenger.

Moreover, the phase difference between the high frequency low voltage signal from the oscillation circuit on the side of the oscillation circuit 11 from the current detecting circuit 15 and the displacement current signal on the side of the antenna electrodes 4 depends on an object which exists on the seat 1. Especially, when the object is a person, there is the phase difference which is distinguishable from a substance. Therefore, by detecting the phase difference by the phase difference detecting circuit 24, the existence or non-existence of the passenger on the seat 1 can be surely and simply detected along with the determination of the current detection data which relates to the head position based on the detection current.

Especially, the air bag of the air bag control system 30 is set to the expansion allowed state when the passenger is determined to be an adult because the head position is high. Also, the air bag of the air bag control system 30 is and set to the expansion inhibited state when the passenger is determined to be a child SP because the head position is low. Therefore, even if the automobile collides, an air bag system can be controlled based on whether the head position is higher than the threshold data, i.e., the passenger is the adult or the child.

Also, in the control unit 10, a single polarity power supply of the power supply circuit 24 may be used as the system power supply and the oscillation circuit 11 may generate the high frequency low voltage signal of the square wave using only the positive polarity power supply. In this case, since the unit circuit structure can be simplified in addition to power supply circuit 24 and the oscillation circuit 11, the system cost can be substantially reduced.

Moreover, the voltage amplitude of the high frequency low voltage signal which is outputted to the antenna electrodes 4 (4a to 4g) is controlled to be approximately constant by the amplitude control circuit 12. Therefore, the comparing and determining process of the data which relates to the current detected by the current detecting circuit 15 and the threshold data with respect to the head position which is stored in the control circuit 22 become easy. Thus, the detection of the high reliability and the precision becomes possible.

It should be noted that the present invention is not limited by the above embodiments at all. For example, the number of antenna electrodes and the positions of the antenna electrodes are not limited and can be determined suitably. For example, the head position can be more correctly detected, if the number of antenna electrodes is increased more than seven in the embodiment.

Also, the high frequency low voltage signal may be generated by dividing a clock signal of the control circuit 20 suitably in place of the oscillation of the oscillation circuit. Otherwise, it is possible to generate the high frequency low voltage signal of the square waveform by switching operation of the power supply using the clock signal from the control circuit. The frequency of the high frequency low voltage signal may be set in a frequency range other than 120 KHz according to the situation of automobile. Also, the voltage amplitude of the high frequency low voltage signal may be set in a voltage range other than the voltage of 5 to 12 V.

Moreover, the amplitude control circuit and the phase difference detecting circuit can be omitted depending on the precision of the system power supply, the function required in the system and so on.

As above mentioned, according to the second embodiment, the current determined in accordance with the difference in the dielectric constant of each of the body portions part flows through the antenna electrode corresponding to the head, the neck, and the shoulder of the passenger on the seat. Therefore, it is possible to easily detect whether the passenger is on the seat and whether the passenger is an adult, by detecting or extracting the shoulder line from the these currents to detects a head position.

Also, the plurality of the antenna electrodes are band-shaped and provided in the wide range in the horizontal direction in the back supporting section. Therefore, even if the attitude of the passenger on the seat shifts into the horizontal direction of the seat, the head position can be precisely detected, as in case that the heat position is located in the regular position. Therefore, the head position of the passenger can be accurately detected without being too much influenced by the attitude of the passenger.

Especially the air bag of the air bag control system 30 is set to the expansion allowed state when the passenger is determined to be an adult because the head position is high. Also, the air bag of the air bag control system 30 is set to the expansion inhibited state, when the passenger is determined to be a child SP because the head position is low. Therefore, even if the automobile collides, the air bag system can be appropriately controlled based on whether the head position is higher than the threshold data, i.e., whether the passenger is an adult or a child.

Next, the passenger detecting system according to the third embodiment of the present invention will be described.

As mentioned above, each the antenna electrode 4 is connected with the passenger detecting unit 10 of the processing detecting apparatus. In the passenger detecting unit 10, the high frequency low voltage signal with the voltage of about 5 to 12 V and the frequency of about 100 KHz is applied to the antenna electrode 4 through the switch 18 and the cable 6. For example, the cable 106 is composed of a signal line and a shield line, and protects the signal from noise.

Figure 1:
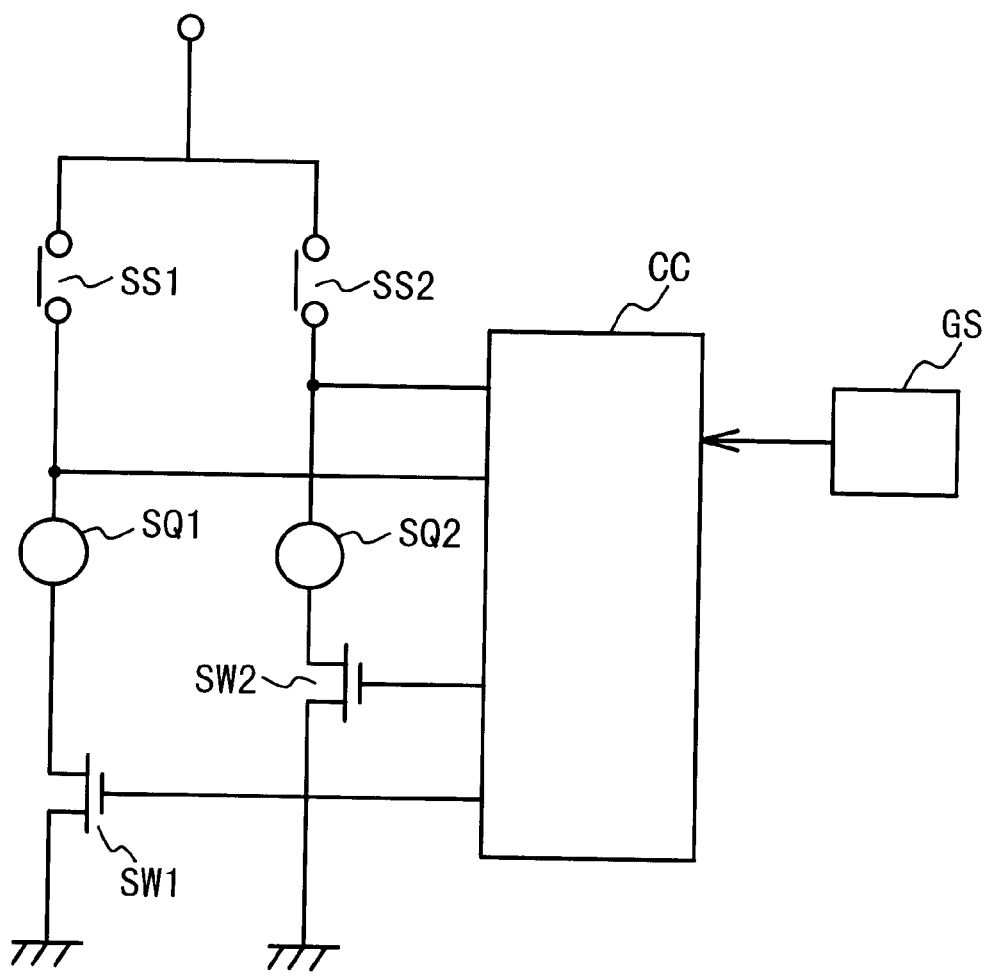
FIG. 1 is a circuit block diagram of a first conventional example of an air bag system.
Figure 2:
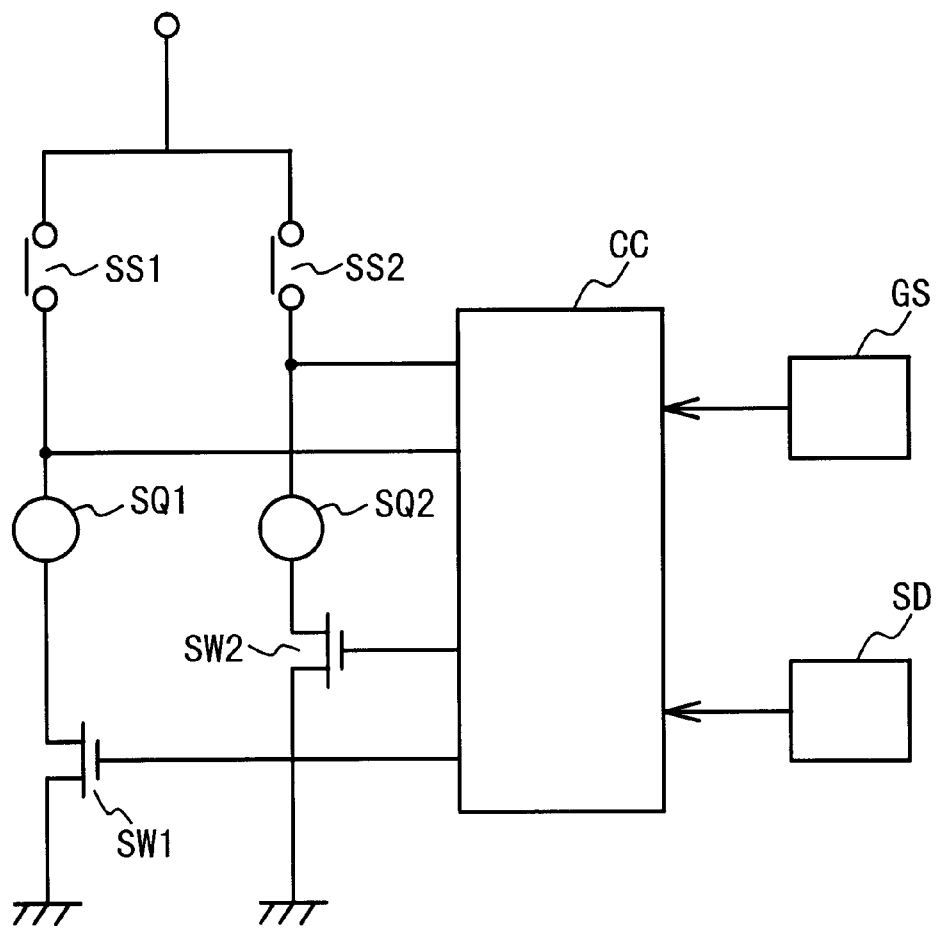
FIG. 2 is a circuit block diagram of a second conventional example of an air bag system.
Figure 3:
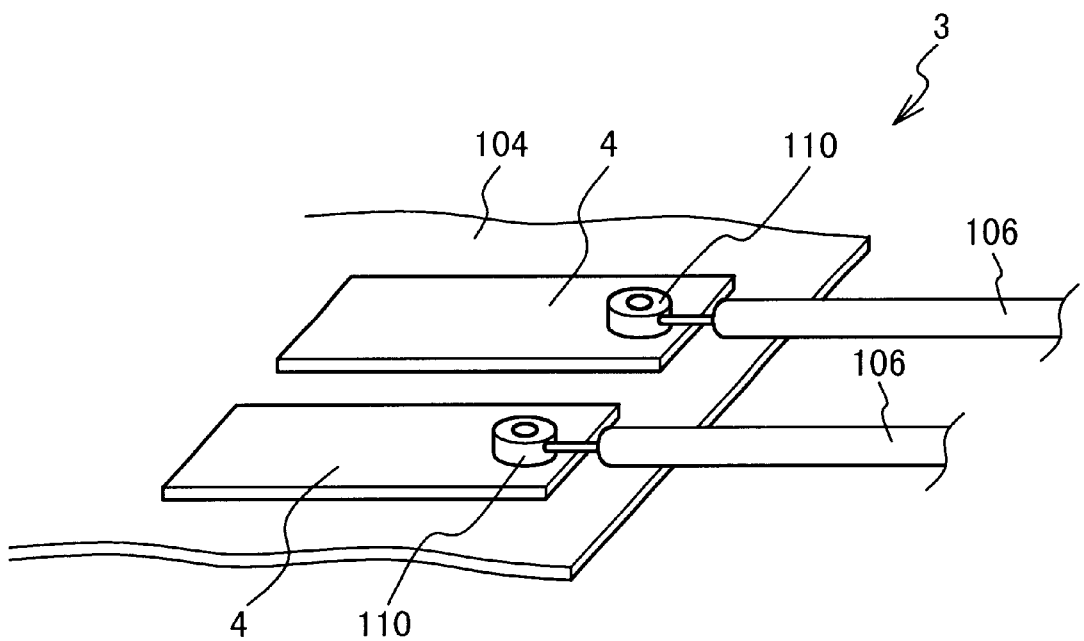
FIG. 3 is a perspective view showing an electrode connection structure of a conventional passenger detecting sensor.

By the way, as shown in FIG. 3, a passenger detecting sensor 103 is conventionally provided with antenna electrodes 4 formed of a plurality of electrically conductive cloth portions on an insulting cloth and provided in a predetermined arranging pattern on the surface of a base member 104. The tip section of the cable 106 is electrically and mechanically connected with each of the antenna electrodes 4 through a connection terminal 110 of exclusive use. As the connection terminal 110 is used a hook type or a pin type terminal caulked and fixed to the antenna electrode 4 and the base member 104. However, the antenna electrode 4 formed of the cloth and the base member 104 of the non-weaving cloth can not be made thick from the viewpoint of the sitting feeling on the seat. Therefore, the mechanical connection strength of connection terminal 110 to the antenna electrode 4 and the base member 104 becomes insufficient, so that the contact area between them become insufficient. As a result, if the passenger detecting sensor 103 is installed in the seat and an external force is applied to the sensor 103 when a passenger sits down on the seat, the electrical and mechanical connection state between the antenna electrode 4 and the cable 106 are sometimes damaged.

For this reason, the electrode connection structure in the passenger detecting system according to the third embodiment of the present invention will be described below with reference to FIGS. 21A and 21B.

Figure 21A:
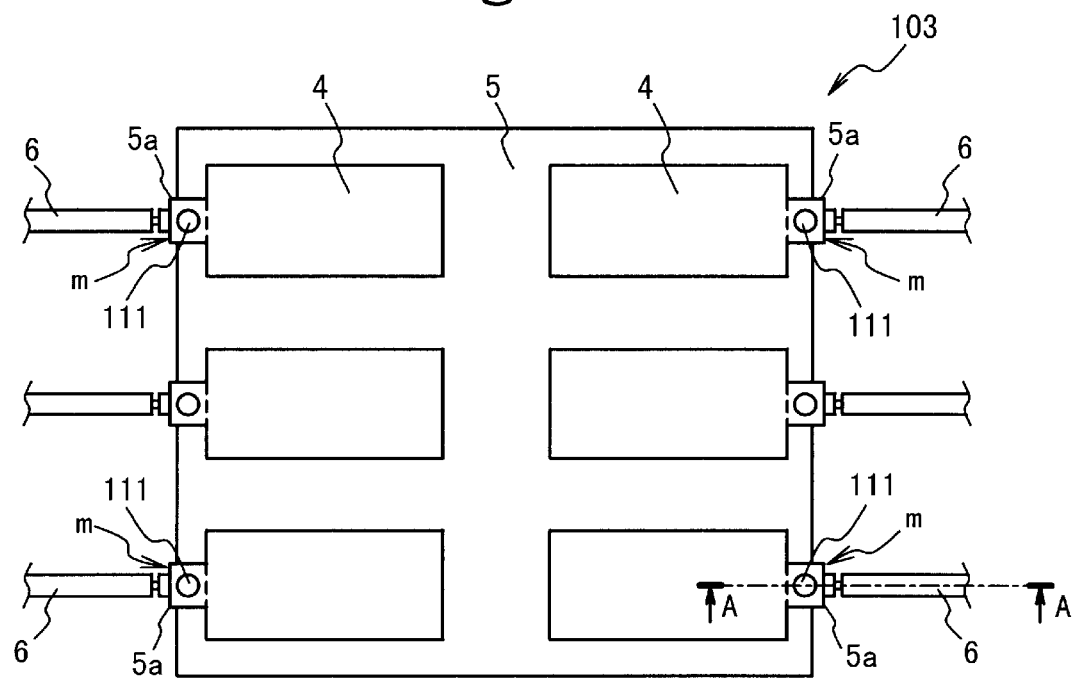
FIG. 21A is a diagram showing an electrode connection structure of the passenger detecting sensor according to the third embodiment of the present invention.
Figure 21B:
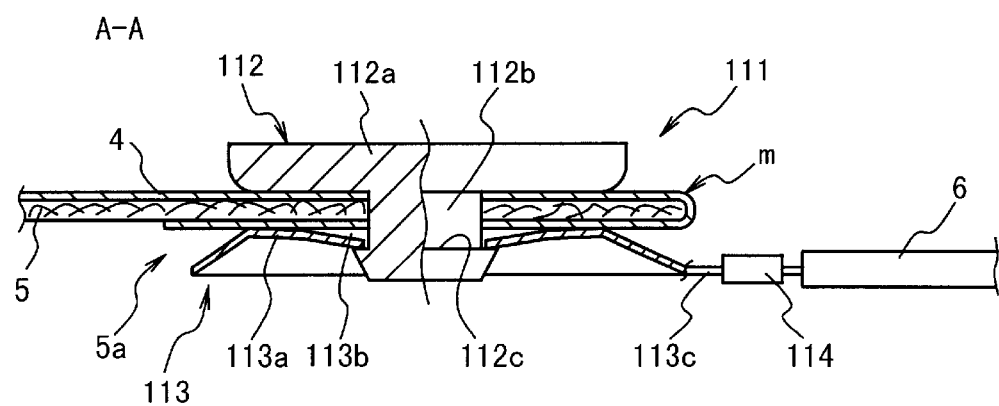
FIG. 21B is a partially expanded cross sectional view of the structure along the A—A line of FIG. 21A.

As shown in FIGS. 21A and 21B, in the electrode connection structure, an extending electrode section 5a extends from a peripheral portion of the antenna electrode 4 formed of an electrically conductive cloth portion on the surfaces of the base member 5. The extending electrode section 5a is turned back to the back surface of the base member 5 to form a triple laminate layer of the antenna electrode 4, the base member 5 and the extending electrode section 5a. The antenna electrode 4 and a connection terminal 111 are clipped electrically and mechanically by a clip member 112 in the triple laminate layer potion. The connection terminal 111 is connected to the cable 6 as shown in FIGS. 21A and 21B.

Figure 22:
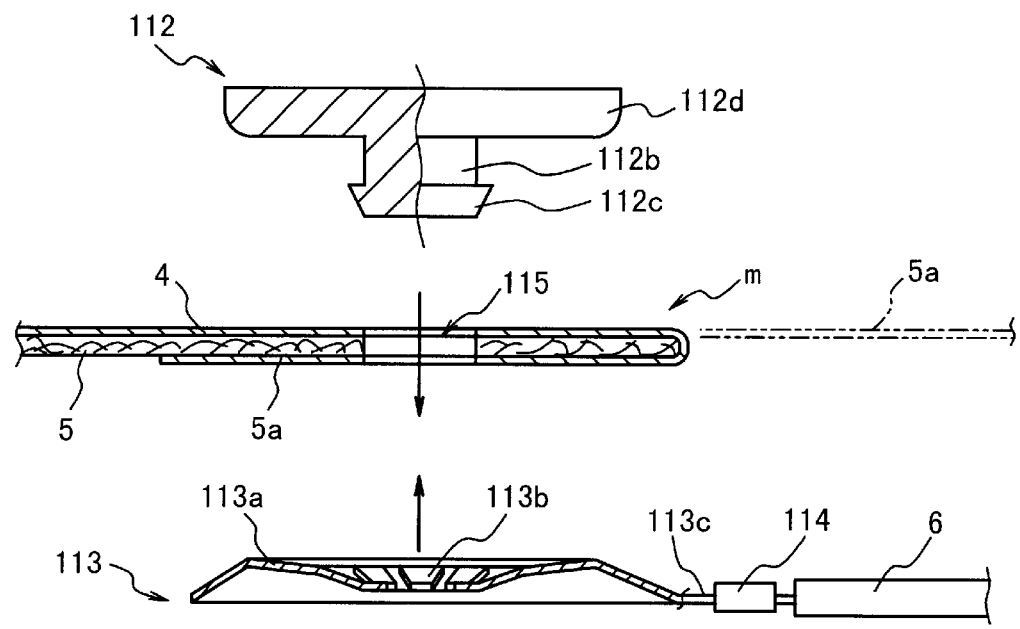
FIG. 22 is an exploded cross sectional view of the electrode connection structure shown in FIG. 21B.
Figure 23:
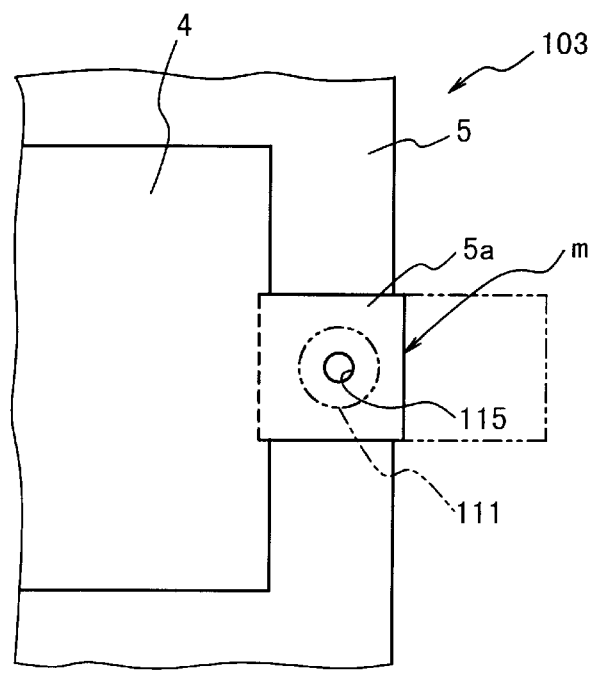
FIG. 23 is a partial plan view of the passenger detecting sensor having the electrode connection structure shown in FIG. 22.

For example, the rectangular antenna electrodes 4 of electrically conductive cloth are fixed by the sticking or thermal-compression in the peripheral section of the rectangular base member 104 of the non-weaving cloth to form the passenger detecting sensor 103. In this case, the extending electrode section 5a is formed in the center of the peripheral section of the antenna electrode 4, as shown by the chain line in FIG. 22 and FIG. 23. The extending electrode section 5a is turned back to the back surface of the base member 5 and fixed to the base member 5 by the sticking and thermal-compression. The extending electrode section 5a partially overlaps the antenna electrode 4. The connection terminal 111 is located in a laminate portion where the antenna electrode 4, the base member 5 and the turned-back extending electrode section 5a overlap, and clipped by the clip member 112. The clip member 112 is composed of a first portion 112c with a first diameter, a second portion 112b with a second diameter, and a third portion 112d with a third diameter, as shown in FIG. 22. The first and third diameters are larger than the second diameter. The third diameter may be larger than the first diameter. The connection terminal 111 is composed of a peripheral portion 113a and a plurality of nail portions 113b extending to a center of the terminal 111. The peripheral portion 113a has the convex shape in the upper direction. A hole 115 is formed in the laminate portion and the clip member 112 is inserted into the hole 115 to pass through the connection terminal 111. The clip member 112 is elastically fixed by the nail portions 113b and the peripheral portion 113a. The clip member 112 may formed of an electrically conductive material or an insulative material. In this case, the connection terminal 111 is electrically connected to the antenna electrode 4 through the turnedback extending electrode section 5a. In this way, the fixing operation of the clip member is very easy and can be fixed surely. It should be noted that the connection terminal 111 is connected to the cable 6 through a terminal 114.

Figure 24:
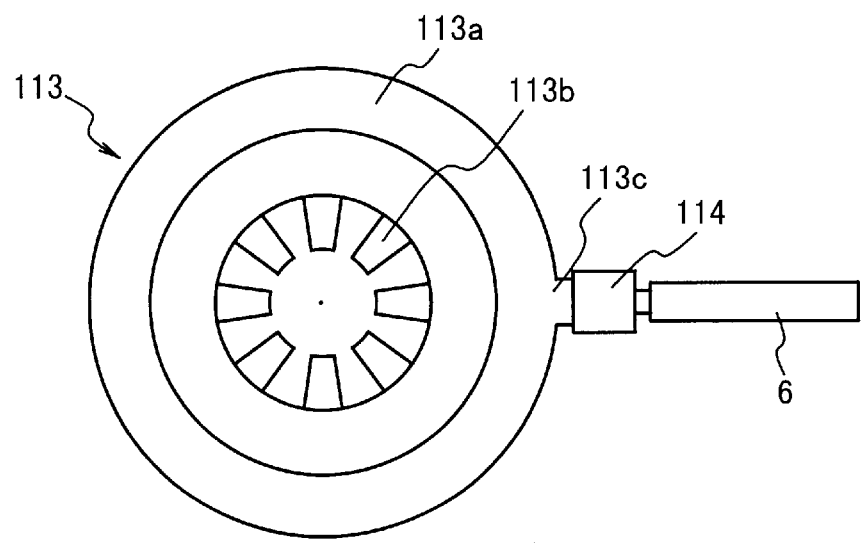
FIG. 24 is a plan view of a connection terminal and a cable in a first modification of the electrode connection structure of the present invention.
Figure 25:
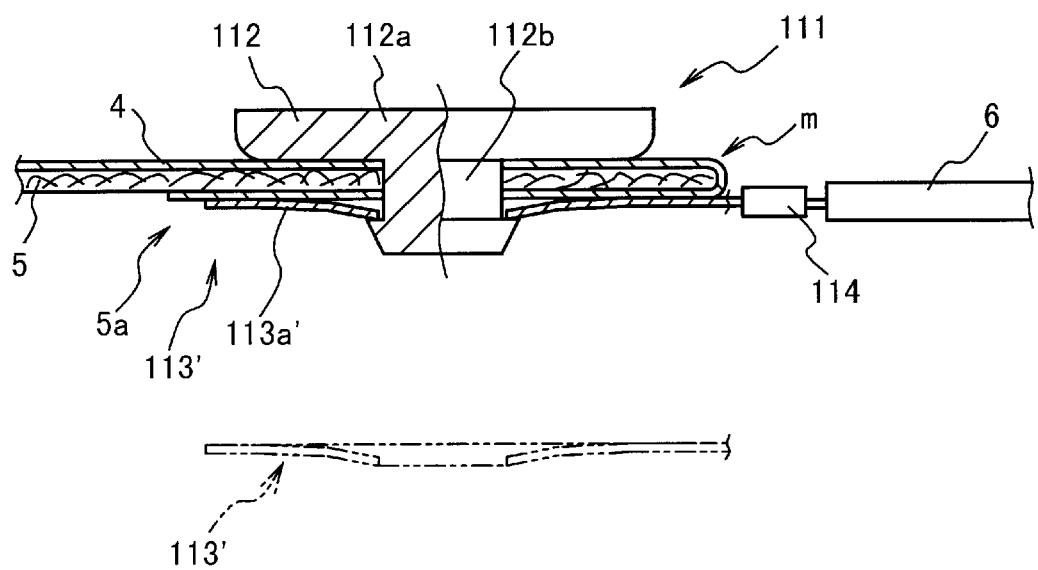
FIG. 25 is a cross sectional view of the first modification of the electrode connection structure using the connection terminal shown in FIG. 24 in the passenger detecting sensor of the present invention.

Next, a first modification of the electrode connection structure will be described below. The first modification of the electrode connection structure is different from the third embodiment in that the peripheral portion 113a of the connection terminal 113 is flat, as shown in FIGS. 24 and 25. The other structure in the first modification is the same as the electrode connection structure in the third embodiment.

Figure 26:
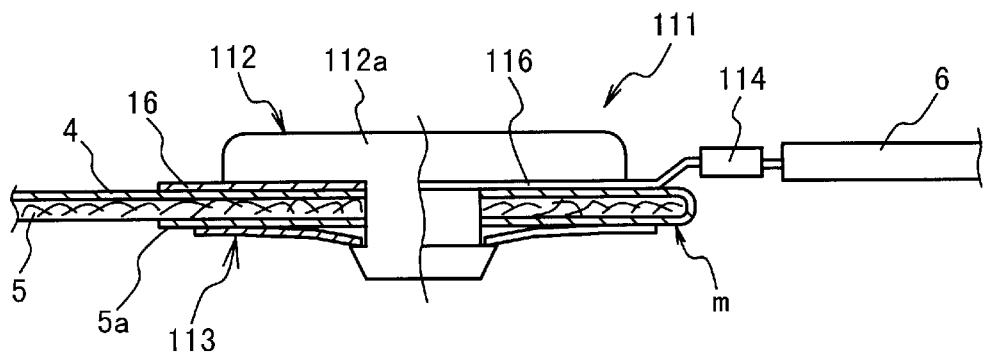
FIG. 26 is a cross sectional view of a second modification of the electrode connection structure in the passenger detecting sensor of the present invention.

Next, a second modification of the electrode connection structure will be described below. In the second modification of the electrode connection structure, a stopper member is adopted. The stopper member has the same structure as that of the connection terminal 113 in the second modification. The connection terminal 116 has a flat structure as a whole, as shown in FIG. 26. The connection terminal 116, the antenna electrode 4, the base member 5, the turned-back extending electrode section 5a, and the stopper member 113 are clipped by the clip member 111 in the laminate portion. In this case, the clip member 111 is inserted into a hole of the connection terminal 116 to pass through the antenna electrode 4, the base member 5, the turned-back extending electrode section 5a, and the stopper member 113. The clip member 111 is elastically fixed by the nail portion of the stopper member 113 and the first portion 112c of the clip member 111. It should be noted that the connection terminal is connected to the cable 6 through a terminal 114.

Figure 27A:
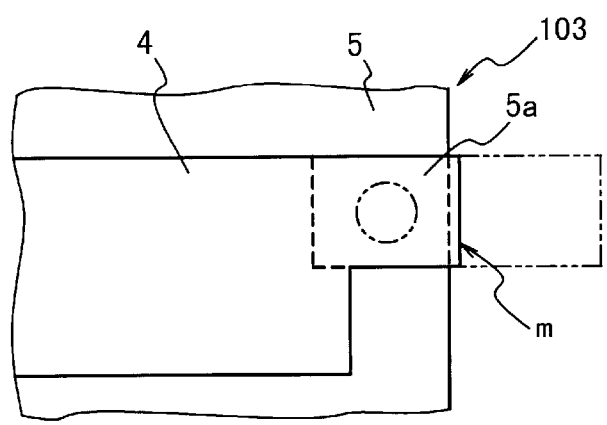
FIGS. 27A and 27B are partial plan views of third and the fourth modification of the electrode connection structure in the passenger detecting sensor of the present invention.

Next, a third modification of the electrode connection structure will be described below. In the third modification of the electrode connection structure, the extending electrode section 5a is provided in an edge portion of the peripheral portion of the antenna electrode 4, as shown in FIG. 27A. The other structure in the third modification is the same as the electrode connection structure in the third embodiment.

Figure 27B:
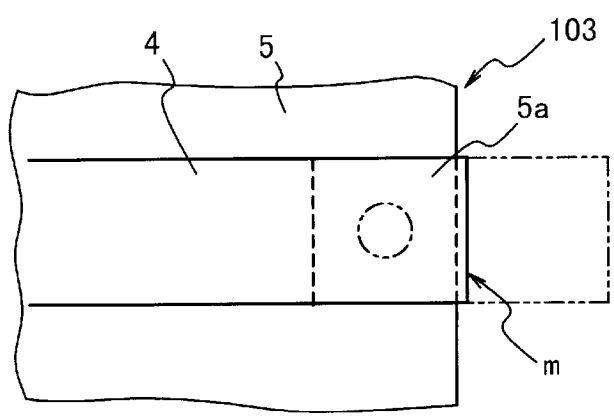

Next, a fourth modification of the electrode connection structure will be described below. In the fourth modification of the electrode connection structure, the extending electrode section 5a has the same width as that of the antenna electrode 4, as shown in FIG. 27B. The other structure in the third modification is the same as the electrode connection structure in the third embodiment.

It should be noted that the present invention is not limited to the above examples. For example, the connection terminal is fixed by the clip member and the nail portions of the connection terminal. However, the clip member may be deformed to fix the connection terminal to the clip member. Also, a lag terminal may be used in addition to the connection terminal.

Also, the seat member which has insulation may be used as the base member in place of the cloth.

Also, the connection terminal and the cable may be connected by caulking, melting, soldering or the like.

Further, according to this embodiment, the antenna electrode, the base member, the extending electrode section and the connection terminal are laminated or fixed by the clip member. Therefore, the connection terminal contacts the extending electrode section with a large area. thus, the electrical and mechanical connection is improved.

Figure 28:
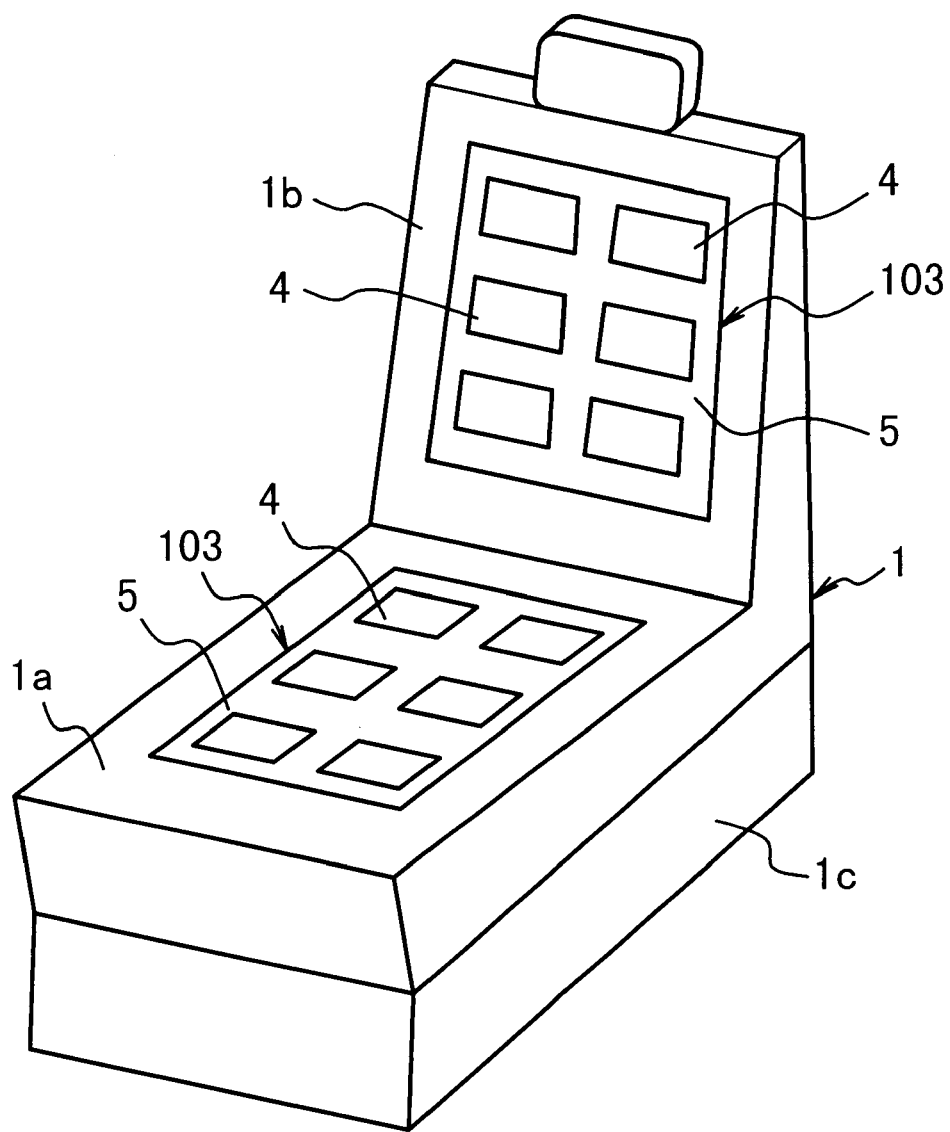
FIG. 28 is a perspective view of the seat in which the passenger detecting sensors used in the passenger detecting system according to the fourth embodiment of the present invention are installed.
Figure 29:
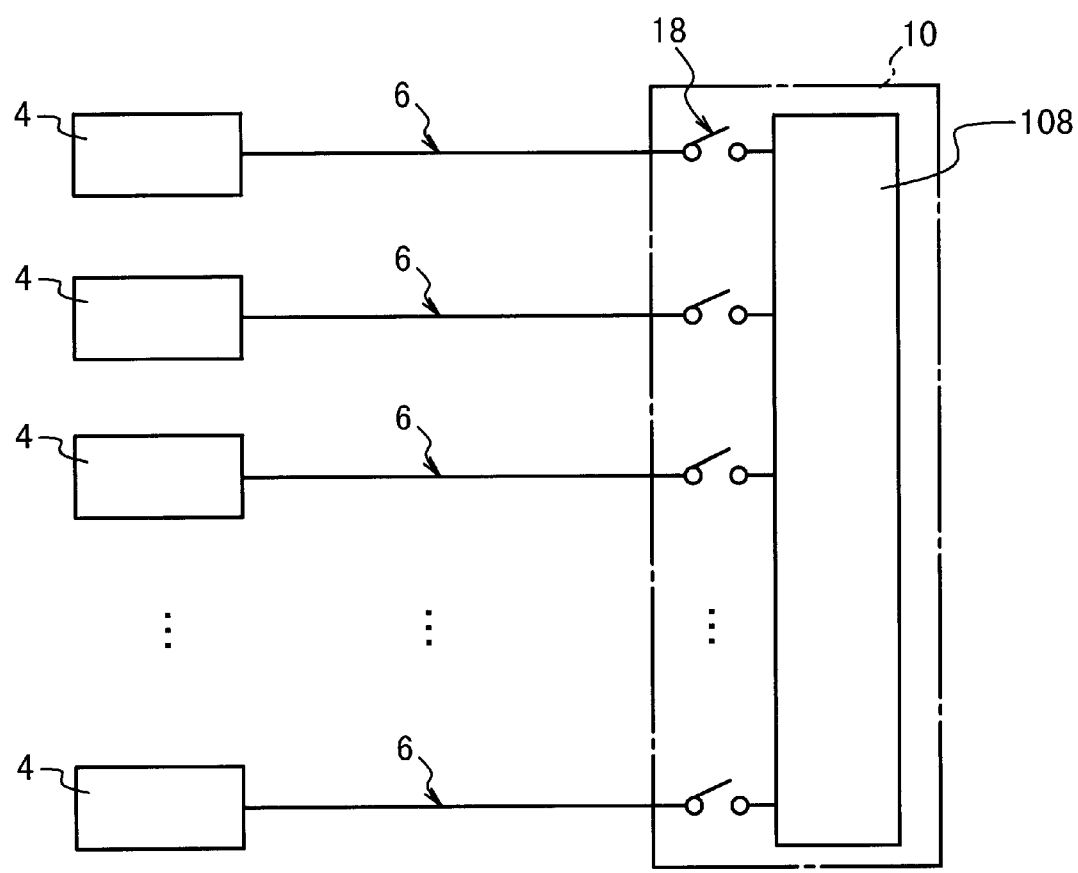
FIG. 29 is a circuit block diagram of the passenger detecting system which is installed in the seat shown in FIG. 28.

Next, the passenger detecting system according to the fourth embodiment of the present invention will be described below. In this embodiment, the antenna electrodes 4 are provided on the surface of the seat section 1a in addition to the back supporting section 1b, as shown in FIG. 28. In this way, the detection precision can be improved. Also, the antenna electrodes are connected to the passenger detecting unit 10 as shown in FIG. 29.

An air bag system can be formed by combining the passenger detecting system according to either of the first to the fourth embodiments with the air bag control system 30 shown in FIG. 8.

What is claimed is:

1. A passenger detecting apparatus comprising:
a plurality of antenna electrodes provided in a seat;
a signal generating section generating an electrode signal;
a switching circuit sequentially supplying said electrode signal to said plurality of antenna electrodes one by one in response to a switching control signal;
a detecting section detecting change of said electrode signal and generating a detection signal when said electrode signal is supplied to each of said plurality of antenna electrodes; and
a control unit outputting said switching control signal to said switching circuit and generating a passenger data associated with a passenger on said seat based on said detection signal for each of said plurality of antenna electrodes.

2. A passenger detecting apparatus according to claim 1, further comprising:
an amplitude detecting circuit detecting and amplitude of said electrode signal; and
an amplitude control circuit adjusting the amplitude of said electrode signal to a predetermined value in response to an amplitude control signal, and
wherein said control unit outputs said amplitude control signal to said amplitude control circuit based on the detected amplitude of said electrode signal by said amplitude detecting circuit.

3. A passenger detecting apparatus according to claim 1, wherein said passenger data includes a first data indicative of existence or non-existence of the passenger on said seat, and
said control unit generates said first data based on said detection signal for each of said plurality of antenna electrodes.

4. A passenger detecting apparatus according to claim 1, wherein said passenger data includes a second data indicative of whether or not said passenger is a child or an adult.

5. A passenger detecting apparatus according to claim 1, wherein said control unit calculates a summation of said detection signals for said plurality of antenna electrodes, and determines whether said passenger exists on said seat, based on said summation to generate said passenger data.

6. A passenger detecting apparatus according to claim 5, wherein when it is determined that said passenger exists on said seat, said control unit calculates a ratio data of each of said detection signals to said summation, and determines whether said passenger is a child or an adult, based on a distribution pattern of said radio data of said detection signals, to generate said passenger data.

7. A passenger detecting apparatus according to claim 5, wherein when it is determined that said passenger exists on said seat, said control unit calculates a ratio data of each of said detection signals to said summation, determines the ratio data corresponding to a head of said passenger, calculates a second summation of said ratio data of said detection signals other than the ratio data corresponding to the head, and determines whether said passenger is a child or an adult, based on said second summation, to generate said passenger data.

8. A passenger detecting apparatus according to claim 1, wherein said detecting section further detects a phase difference before and after the change of said electrode signal, and said control unit determines whether said passenger exists on said seat, based on said phase difference, to generate said passenger data.

9. A passenger detecting apparatus according to claim 8, wherein when it is determined that said passenger exists on said seat, said control unit detects one of said plurality of antenna electrodes corresponding to a position of a shoulder of said passenger, based on the detection signals, and determines whether said passenger is a child or an adult, based on the detected antenna electrode, to generate said passenger data.

10. A passenger detecting apparatus according to claim 1, wherein said plurality of antenna electrodes are dispersedly provided in said seat.

11. A passenger detecting apparatus according to claim 10, wherein said plurality of antenna electrodes are provided to extend in a horizontal direction and to be apart from each other in a vertical direction.

12. A passenger detecting apparatus according to claim 10, wherein each of said plurality of antenna electrodes is a metal plate.

13. A passenger detecting apparatus according to claim 10, wherein each of said plurality of antenna electrodes is an electrically conductive portion of an insulation cloth.

14. A passenger detecting apparatus according to claim 10, wherein each of said plurality of antenna electrodes is a portion of an insulation cloth in which an electrically conductive paint is painted.

15. A passenger detecting apparatus according to claim 10, wherein each of said plurality of antenna electrodes is a portion of an insulation cloth in which metal threads are woven.

16. A passenger detecting apparatus comprising:

a plurality of antenna electrodes provided in a seat;

a signal generating section generating an electrode signal;

a switching circuit sequentially supplying said electrode signal to said plurality of antenna electrodes one by one in response to a switching control signal;

a detecting section detecting change of said electrode signal and generating a detection signal when said electrode signal is supplied to each of said plurality of antenna electrodes; and a control unit outputting said switching control signal to said switching circuit and generating a passenger data associated with a passenger on said seat based on said detection signal for each of said plurality of antenna electrodes, wherein said plurality of antenna electrodes are dispersedly provided in said seat, wherein each of said plurality of antenna electrodes is an electrically conductive portion of an insulation cloth, wherein each of said antenna electrodes is connected to said switching circuit by use of a cable, and said cable has a washer having a peripheral section and a plurality of portions extending from said peripheral section into a direction of a center portion, and a fixture has a first section of a first diameter, a second section of a second diameter on said first section, the second diameter being smaller than the first diameter, and a third section of a third diameter on said second section, the third diameter being larger than the first diameter, and said fixture is pushed and inserted to pass through a base member, said antenna electrode and the center portion of said washer such that said base member and said antenna electrode are sandwiched by said third section of said fixture and said peripheral section of said washer through an elastic force of said plurality of portions of said washer.

17. A passenger detecting apparatus according to claim 16, wherein said antenna electrode is turned at an edge portion of said base member, and said washer is electrically conductive.

18. A method of detecting a passenger in an automobile, comprising:

sequentially supplying an electrode signal to a plurality of antenna electrodes one by one, said plurality of antenna electrodes being provided in a seat;

detecting change of said electrode signal;

generating a detection signal when said electrode signal is supplied to each of said plurality of antenna electrodes; and generating a passenger data associated with a passenger on said seat based on said detection signal for each of said plurality of antenna electrodes.

19. A method according to claim 18, further comprising:

detecting an amplitude of said electrode signal; and adjusting the amplitude of said electrode signal to a predetermined value based on the detected amplitude of said electrode signal.

20. A method according to claim 18, wherein said generating a passenger data includes:

determining whether said passenger is on said seat, and whether said passenger is a child or an adult, based on a distribution pattern of said detection signals.

21. A method according to claim 18, wherein said generating a passenger data includes:

calculating a summation of said detection signals for said plurality of antenna electrodes; and determining whether said passenger exists on said seat, based on said summation to generate said passenger data.

22. A method according to claim 21, wherein said generating a passenger data includes:

calculating a ratio data of each of said detection signals to said summation, when it is determined that said passenger exists on said seat; and determining whether said passenger is a child or an adult, based on a distribution pattern of said radio data of said detection signals, to generate said passenger data.

23. A method of detecting a passenger in an automobile, comprising:

sequentially supplying an electrode signal to a plurality of antenna electrodes one by one, said plurality of antenna electrodes being provided in a seat;

detecting change of said electrode signal;

generating a detection signal when said electrode signal is supplied to each of said plurality of antenna electrodes; and generating a passenger data associated with a passenger on said seat based on said detection signal for each of said plurality of antenna electrodes, wherein said generating a passenger data includes:
calculating a summation of said detection signals for said plurality of antenna electrodes;
determining whether said passenger exists on said seat, based on said summation to generate said passenger data,
calculating a ratio data of each of said detection signals to said summation, when it is determined that said passenger exists on said seat;
determining the ratio data corresponding to a head of said passenger;
calculating a second summation of said ratio data of said detection signals other than the ratio data corresponding to the head; and
determining whether said passenger is a child or an adult, based on said second summation, to generate said passenger data.

24. A method of detecting a passenger in an automobile, comprising:
sequentially supplying an electrode signal to a plurality of antenna electrodes one by one, said plurality of antenna electrodes being provided in a seat;
detecting change of said electrode signal;
generating a detection signal when said electrode signal is supplied to each of said plurality of antenna electrodes;
generating a passenger data associated with a passenger on said seat based on said detection signal for each of said plurality of antenna electrodes;
detecting a phase difference before and after the change of said electrode signal, and
said generating a passenger data includes determining whether said passenger exists on said seat, based on said phase difference, to generate said passenger data.

25. A method according to claim 24, wherein said generating a passenger data includes:
detecting one of said plurality of antenna electrodes corresponding to a position of a shoulder of said passenger, based on the detection signals, when it is determined that said passenger exists on said seat; and
determining whether said passenger is a child or an adult, based on the detected antenna electrode, to generate said passenger data.

26. A passenger detecting apparatus comprising:
a plurality of antenna electrodes provided in a seat;
a detecting section detecting change of an electric field intensity around each of said plurality of antenna electrodes and generating a detection signal; and
a control unit generating a passenger data associated with a passenger on said seat based on said detection signal for each of said plurality of antenna electrodes.

27. A passenger detecting apparatus according to claim 26, wherein said passenger data includes a first data indicative of existence or non-existence of the passenger on said seat.

28. A passenger detecting apparatus according to claim 26, wherein said passenger data includes a second data indicative of whether or not said passenger is a child or an adult.

29. A passenger detecting apparatus according to claim 26, wherein said plurality of antenna electrodes are dispersedly provided in said seat.

30. A passenger detecting apparatus according to claim 29, wherein said plurality of antenna electrodes are provided to extend in a horizontal direction and to be apart from each other in a vertical direction.

31. A passenger detecting apparatus according to claim 29, wherein each of said plurality of antenna electrodes is a metal plate.

32. A passenger detecting apparatus according to claim 29, wherein each of said plurality of antenna electrodes is an electrically conductive portion of an insulation cloth.

33. A passenger detecting apparatus according to claim 29, wherein each of said plurality of antenna electrodes is a portion of an insulation cloth in which an electrically conductive paint is painted.

34. A passenger detecting apparatus according to claim 29, wherein each of said plurality of antenna electrodes is a portion of an insulation cloth in which metal threads are woven.

35. A method of controlling expansion of an air bag in an automobile, comprising:
sequentially supplying an electrode signal to a plurality of antenna electrodes one by one, said plurality of antenna electrodes being provided in a seat;
detecting change of said electrode signal;
generating a detection signal when said electrode signal is supplied to each of said plurality of antenna electrodes;
generating a passenger data associated with a passenger on said seat based on said detection signal for each of said plurality of antenna electrodes;
controlling an air bag based on said passenger data such that said air bag is selectively expanded.

36. A method according to claim 35, further comprising:
detecting an amplitude of said electrode signal; and
adjusting the amplitude of said electrode signal to a predetermined value based on the detected amplitude of said electrode signal.

37. A method according to claim 35, wherein said controlling an air bag includes:
allowing expansion of said air bag when it is determined that said passenger is on said seat and that said passenger is an adult; and
inhibiting the expansion of said air bag when it is determined that said passenger is not on said seat or that said passenger is a child.

38. A method according to claim 35, wherein said generating a passenger data includes:
determining whether said passenger is on said seat, and whether said passenger is a child or an adult, based on a distribution pattern of said detection signals.

39. A method according to claim 35, wherein said generating a passenger data includes:
calculating a summation of said detection signals for said plurality of antenna electrodes; and
determining whether said passenger exists on said seat, based on said summation to generate said passenger data.

40. A method of controlling expansion of an air bag in an automobile, comprising:
sequentially supplying an electrode signal to a plurality of antenna electrodes one by one, said plurality of antenna electrodes being provided in a seat;
detecting change of said electrode signal;
generating a detection signal when said electrode signal is supplied to each of said plurality of antenna electrodes;
generating a passenger data associated with a passenger on said seat based on said detection signal for each of said plurality of antenna electrodes;
controlling an air bag based on said passenger data such that said air bag is selectively expanded, wherein said generating a passenger data includes:
  calculating a summation of said detection signals for said plurality of antenna electrodes; and
  determining whether said passenger exists on said seat, based on said summation to generate said passenger data;
  calculating a ratio data of each of said detection signals to said summation, when it is determined that said passenger exists on said seat; and
  determining whether said passenger is a child or an adult, based on a distribution pattern of said radio data of said detection signals, to generate said passenger data.

41. A method of controlling expansion of an air bag in an automobile, comprising:
  sequentially supplying an electrode signal to a plurality of antenna electrodes one by one, said plurality of antenna electrodes being provided in a seat;
  detecting change of said electrode signal;
  generating a detection signal when said electrode signal is supplied to each of said plurality of antenna electrodes;
  generating a passenger data associated with a passenger on said seat based on said detection signal for each of said plurality of antenna electrodes;
  controlling an air bag based on said passenger data such that said air bag is selectively expanded,
  wherein said generating a passenger data includes:
    determining whether said passenger is on said seat, and whether said passenger is a child or an adult, based on a distribution pattern of said detection signals;
    calculating a ratio data of each of said detection signals to said summation, when it is determined that said passenger exists on said seat;
    determining the ratio data corresponding to a head of said passenger;
    calculating a second summation of said ratio data of said detection signals other than the ratio data corresponding to the head; and
    determining whether said passenger is a child or an adult, based on said second summation, to generate said passenger data.

42. A method of controlling expansion of an air bag in an automobile, comprising:
  sequentially supplying an electrode signal to a plurality of antenna electrodes one by one, said plurality of antenna electrodes being provided in a seat;
  detecting change of said electrode signal;
  generating a detection signal when said electrode signal is supplied to each of said plurality of antenna electrodes;
  generating a passenger data associated with a passenger on said seat based on said detection signal for each of said plurality of antenna electrodes;
  controlling an air bag based on said passenger data such that said air bag is selectively expanded,
  detecting a phase difference before and after the change of said electrode signal, and
  said generating a passenger data includes determining whether said passenger exists on said seat, based on said phase difference, to generate said passenger data.

43. A method of controlling expansion of an air bag in an automobile, comprising:
  sequentially supplying an electrode signal to a plurality of antenna electrodes one by one, said plurality of antenna electrodes being provided in a seat;
  detecting change of said electrode signal;
  generating a detection signal when said electrode signal is supplied to each of said plurality of antenna electrodes;
  generating a passenger data associated with a passenger on said seat based on said detection signal for each of said plurality of antenna electrodes;
  controlling an air bag based on said passenger data such that said air bag is selectively expanded,
  wherein said generating a passenger data includes:
    detecting one of said plurality of antenna electrodes corresponding to a position of a shoulder of said passenger, based on the detection signals, when it is determined that said passenger exists on said seat; and
    determining whether said passenger is a child or an adult, based on the detected antenna electrode, to generate said passenger data.

\* \* \* \* \*